(12) United States Patent
Dieleman et al.

(10) Patent No.: US 12,737,937 B2
(45) Date of Patent: Sep. 15, 2026

(54) VIDEO GENERATION AND ENCODING USING MACHINE-LEARNING MODELS

(71) Applicant: GDM Holding LLC, Mountain View, CA (US)

(72) Inventors: Sander Etienne Lea Dieleman, London (GB); Junyoung Chung, London (GB); Marc van Zee, Humlebæk (DK); Shlomo Fruchter, Ness Ziona (IL); Jeffrey Donahue, London (GB); Yutian Chen, Cambridge (GB); Ankush Gupta, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/349,499

(22) Filed: Oct. 3, 2025

(65) Prior Publication Data

US 2026/0099959 A1 Apr. 9, 2026

Related U.S. Application Data

(60) Provisional application No. 63/703,880, filed on Oct. 4, 2024.

(51) Int. Cl.

| | |
|---|---|
| ***G06T 11/00*** | (2026.01) |
| ***G06T 3/4046*** | (2024.01) |
| ***G06T 5/70*** | (2024.01) |
| ***G11B 27/031*** | (2006.01) |

(52) U.S. Cl.
CPC ............ *G06T 11/00* (2013.01); *G06T 3/4046* (2013.01); *G06T 5/70* (2024.01); *G11B 27/031* (2013.01)

(58) Field of Classification Search
None
See application file for complete search history.

(56) References Cited

U.S. PATENT DOCUMENTS

| | | | | |
|---|---|---|---|---|
| 2024/0169631 | A1* | 5/2024 | Kim | G06T 5/70 |
| 2024/0394843 | A1* | 11/2024 | Chemerys | G06N 3/08 |
| 2025/0238905 | A1* | 7/2025 | Mosseri | G06T 3/4053 |

FOREIGN PATENT DOCUMENTS

| | | | | |
|---|---|---|---|---|
| CN | 118887363 | A | * 11/2024 | G06N 3/0455 |

OTHER PUBLICATIONS

Brock et al., "High-performance large-scale image recognition without normalization," Proceedings of the 38th International Conference on Machine Learning, 2021, 139:1059-1071.
Caron et al., "Emerging Properties in Self-Supervised Vision Transformers," CoRR, Apr. 29, 2021, arXiv:2104.14294, 21 pages.
Ho et al., "Denoising diffusion probabilistic models," Advances in Neural Information Processing Systems 33 (NeurIPS 2020), 2020, 12 pages.

(Continued)

*Primary Examiner* — Saptarshi Mazumder
(74) *Attorney, Agent, or Firm* — Fish & Richardson P.C.

(57) ABSTRACT

This specification discloses systems, method and apparatus for performing operations relating to video generation and/or video encoding using machine-learning models, such as latent diffusion models. In some aspects, latent diffusion models are used to generate a latent representation of a generated video, which is then decoded into an output video with a decoder model.

20 Claims, 19 Drawing Sheets

1500

Generate, using a first latent diffusion model, a first latent representation of a video in a first latent space, wherein the first latent representation of the video is at a first resolution 1502

Generate, using a second latent diffusion model and conditioned on the first latent representation, a second latent representation of the video in a second latent space, wherein the second latent representation of the video is at a second resolution that is a higher resolution than the first resolution 1504

Process, using a machine-learning decoder model, the second latent representation of the video to generate an output video in pixel space 1506

(56) References Cited

OTHER PUBLICATIONS

Jia et al., “Scaling up Visual and Vision-language representation learning with noisy text supervision,” Proceedings of the 38th International Conference on Machine Learning, 2021, 139:4904-4916.
Rombach et al., “High-resolution image synthesis with latent diffusion models,” Proceedings of the IEEE/CVF Conference on Computer Vision and Pattern Recognition (CVPR), 2022, pp. 10684-10695.
Tay et al., “UL2: Unifying language learning paradigms,” CoRR, May 10, 2022, arXiv:2205.05131, 39 pages.
Zeghidour et al., “Soundstream: An end-to-end neural audio codec,” IEEE/ACM Transactions on Audio, Speech, and Language Processing, Nov. 23, 2021, 30:495-507.
Zhang et al., “The Unreasonable Effectiveness of Deep Features as a Perceptual Metric,” IEEE Conference on Computer Vision and Pattern Recognition, 2018, pp. 586-595.
Blattmann et al., “Align your Latents: High-Resolution Video Synthesis with Latent Diffusion Models,” CoRR, submitted on Dec. 28, 2023, arXiv:2304.08818v2, pp. 1-44.
Ho et al., “Cascaded Diffusion Models for High Fidelity Image Generation,” CoRR, submitted on Dec. 17, 2021, arXiv:2106.15282v3, 33 pages.
Huang et al., “Noise2Music: Text-conditioned Music Generation with Diffusion Models,” CoRR, submitted on Mar. 6, 2023, arXiv:2302.03917v2, 23 pages.
International Search Report and Written Opinion in International Appln. No. PCT/US2025/049646, mailed on Apr. 15, 2026, 33 pages.
Luo et al., “Diff-Foley: Synchronized Video-to-Audio Synthesis with Latent Diffusion Models,” CoRR, submitted on Jun. 29, 2023, arXiv:2306.17203v1, 21 pages.
Zhang et al., “FoleyCrafter: Bring Silent Videos to Life with Lifelike and Synchronized Sounds,” CoRR, submitted on Jul. 1, 2024, arXiv:2407.01494v1, 14 pages.
Gupta et al., “Photorealistic Video Generation with Diffusion Models,” CoRR, submitted on Dec. 11, 2023, arXiv:2312.06662v1, 13 pages.
Invitation to Pay Additional Fees in International Appln. No. PCT/US2025/049646, mailed on Jan. 21, 2026, 18 pages.
Li et al., “VideoGen: A Reference-Guided Latent Diffusion Approach for High-Definition Text-to-Video Generation,” CoRR, submitted on Sep. 1, 2023, arXiv:2309.00398v1, 11 pages.
Ma et al., “Latte: Latent Diffusion Transformer for Video Generation,” CoRR, submitted on Jan. 5, 2024, arXiv:2401.03048v1, 16 pages.
Qin et al., “xGen-VideoSyn-1: High-fidelity Text-to-Video Synthesis with Compressed Representations,” CoRR, submitted on Aug. 22, 2024, arXiv:2408.12590v1, 19 pages.

* cited by examiner 100
102
102A
Input positional embedding
102B
Target text description
102C
Target quality
102D
Input conditioning image
102E
104
Latent diffusion model
106
106A
Output positional embedding
106A
108
Decoder
110

Extra conditioning latents
Latents to denoise
606
602
602
604

606A
606B
606C
602
602
602
602
602
602
602
602
604A
604B
604C

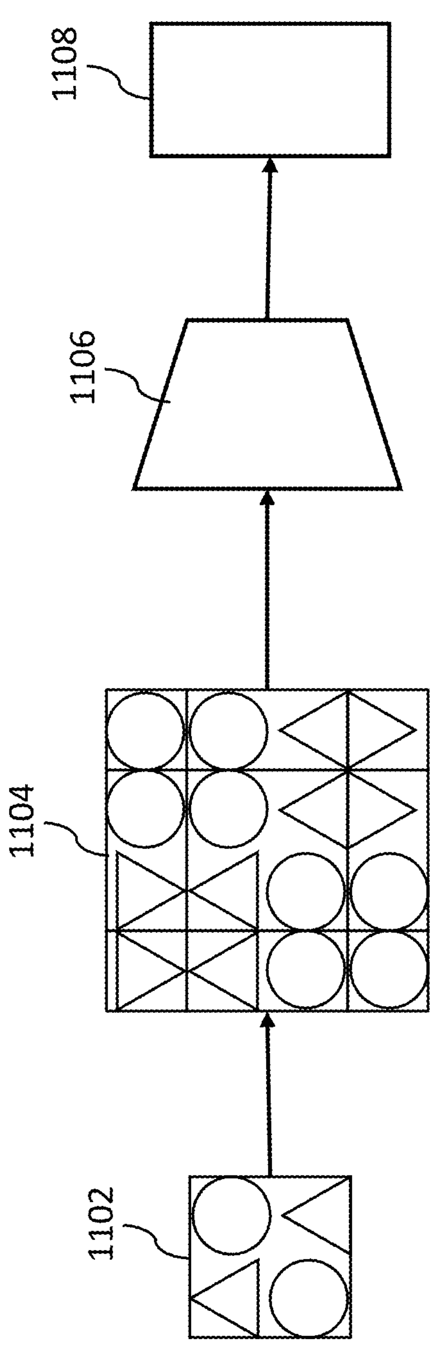
FIG. 11

Figures 14, 15:
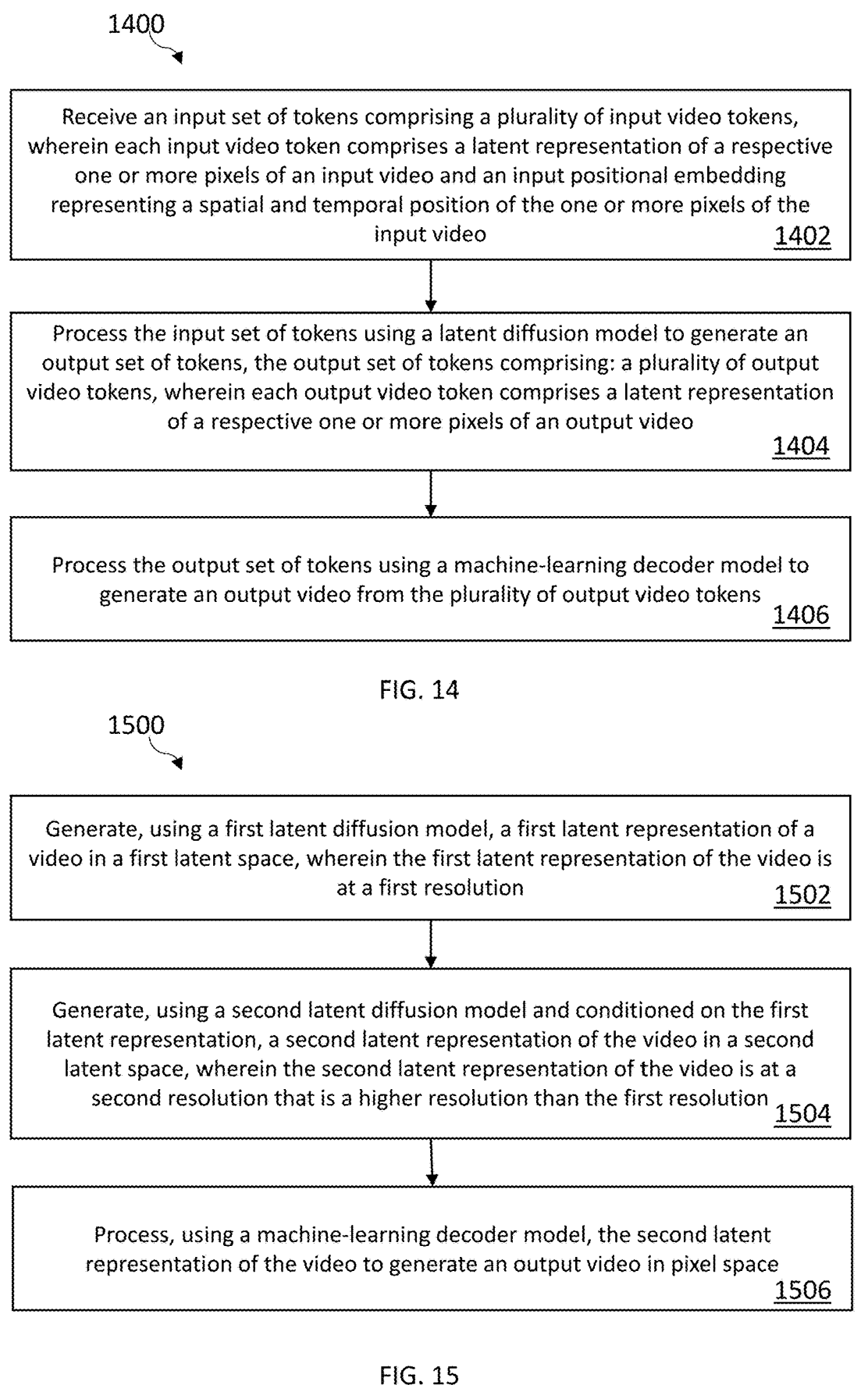

1400

Receive an input set of tokens comprising a plurality of input video tokens, wherein each input video token comprises a latent representation of a respective one or more pixels of an input video and an input positional embedding representing a spatial and temporal position of the one or more pixels of the input video 1402

Process the input set of tokens using a latent diffusion model to generate an output set of tokens, the output set of tokens comprising: a plurality of output video tokens, wherein each output video token comprises a latent representation of a respective one or more pixels of an output video 1404

Process the output set of tokens using a machine-learning decoder model to generate an output video from the plurality of output video tokens 1406

Generate, using a first latent diffusion model, a first latent representation of a video in a first latent space, wherein the first latent representation of the video is at a first resolution 1502

Generate, using a second latent diffusion model and conditioned on the first latent representation, a second latent representation of the video in a second latent space, wherein the second latent representation of the video is at a second resolution that is a higher resolution than the first resolution 1504

Process, using a machine-learning decoder model, the second latent representation of the video to generate an output video in pixel space 1506

Figure 17:
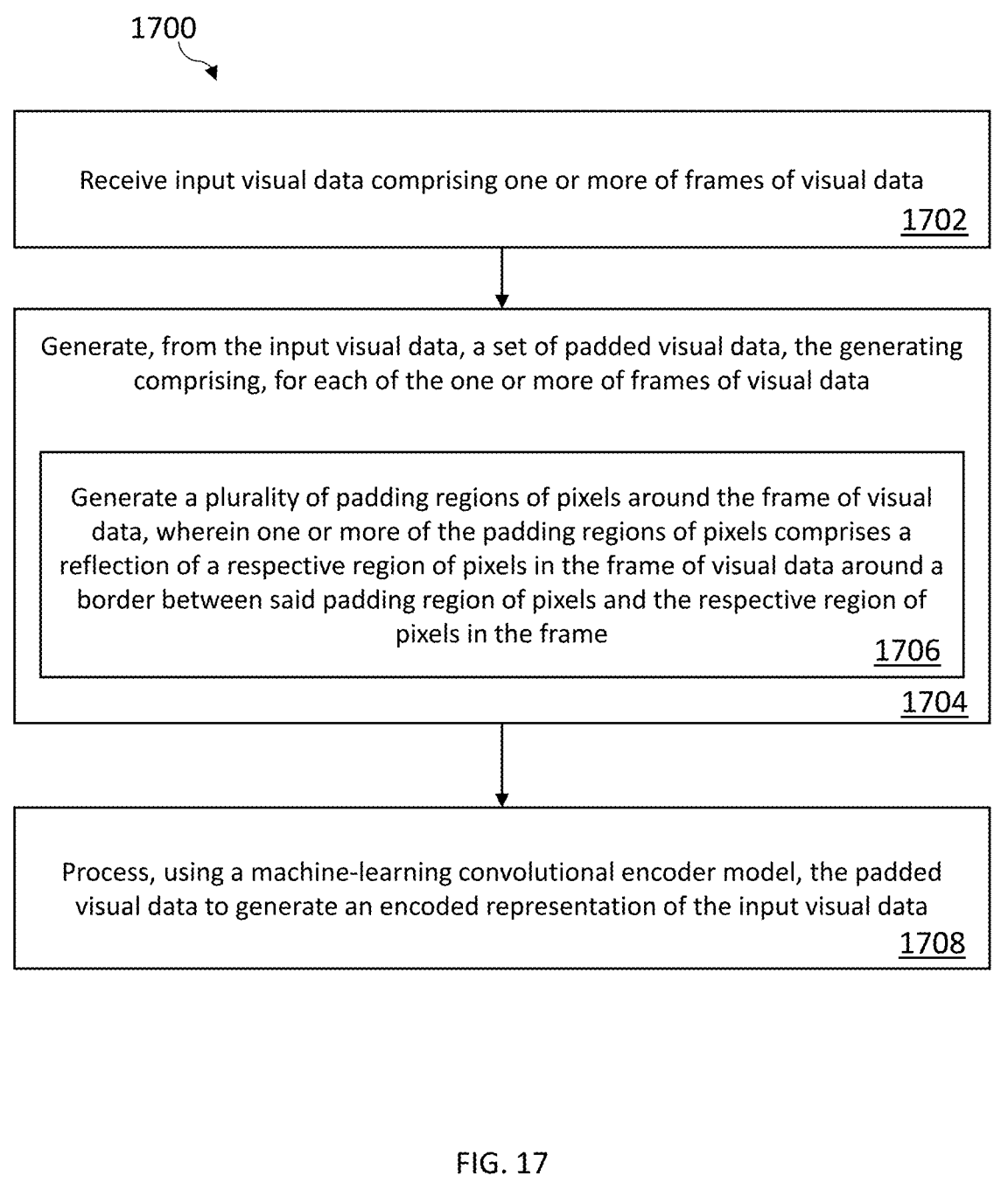

Receive input visual data comprising one or more of frames of visual data 1702

Generate, from the input visual data, a set of padded visual data, the generating comprising, for each of the one or more of frames of visual data Generate a plurality of padding regions of pixels around the frame of visual data, wherein one or more of the padding regions of pixels comprises a reflection of a respective region of pixels in the frame of visual data around a border between said padding region of pixels and the respective region of pixels in the frame 1706

1704

Process, using a machine-learning convolutional encoder model, the padded visual data to generate an encoded representation of the input visual data 1708

Process, using a machine-learned video encoder model, of an input video to generate an encoded representation of the input video
1902

Generate, using a first audio latent diffusion model and based on a set of input data comprising the encoded representation of the input video, a first representation of accompanying audio for the input video, wherein the first representation of the accompanying audio is at a first resolution
1904

Generate, using a second audio diffusion model and conditioned on the first representation of the accompanying audio, a second representation of the accompanying audio for the input video, wherein the second representation of the accompanying audio for the input video is at a second resolution that is a higher resolution than the first resolution
1906

Process, using an audio decoder model, the second representation of the accompanying audio for the input video to generate an output audio waveform of the accompanying audio for the input video
1908

FIG. 19

VIDEO GENERATION AND ENCODING USING MACHINE-LEARNING MODELS

CROSS-REFERENCE TO RELATED APPLICATION

This application claims priority to U.S. Provisional Application No. 63/703,880, filed on Oct. 4, 2024. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification discloses systems, method and apparatus for performing operations relating to video generation and/or video encoding using machine-learning models, such as latent diffusion models.

According to a first aspect of this specification there is disclosed a computer implemented method for generating video data. The method comprises receiving an input set of tokens for processing using a latent diffusion model. The input set of tokens comprises a plurality of input video tokens, wherein each input video token comprises a latent representation of a respective one or more pixels of an input video and an input positional embedding representing a spatial and temporal position of the one or more pixels of the input video. The method further comprises processing the input set of tokens using a latent diffusion model to generate an output set of tokens. The output set of tokens comprises a plurality of output video tokens. Each output video token comprises a latent representation of a respective one or more pixels of an output video. The method further comprises processing the output set of tokens using a machine-learning decoder model to generate an output video from the plurality of output video tokens.

Systems, methods and apparatus implementing the first aspect may be realized to implement one or more of the following advantages. The use of a positional encoding for each video token allows the spatio-temporal structure of the video to be maintained when the video is flattened into a sequence of tokens. The use of both positional and temporal encodings allows the latent diffusion model to operate on a mixture of video resolutions and durations, rather than being restricted to a single spatial resolution and/or single duration.

According to a second aspect of this specification, there is disclosed a computer implemented method for generating output video. The method comprises generating, using a first latent diffusion model (also referred to as a base latent diffusion model), a first latent representation of a video in a first latent space. The first latent representation of the video is at a first resolution. The method further comprises generating, using a second latent diffusion model (also referred to as a latent-to-latent diffusion model) and conditioned on the first latent representation, a second latent representation of the video in a second latent space. The second latent representation of the video is at a second resolution that is a higher resolution than the first resolution, e.g., the second latent representation has a higher number of components than the first latent representation. The method further comprises processing, using a machine-learning decoder model, the second latent representation of the video to generate an output video in pixel space. Any of the decoder models used for video described herein may be used for the decoder model.

Systems, methods and apparatus implementing the second aspect may be realized to implement one or more of the following advantages. The use of two latent diffusion models that act in respective latent spaces, one to generate an initial set of latents and one to upscale the initial set of latents, can improve the computational efficiency and memory usage of a video generation process, particularly when compared to using a diffusion model in pixel space, or a latent-to-pixel diffusion model. The resulting output video can also exhibit a lower level of artefacts.

According to a third aspect of this specification, there is disclosed a computer implemented method for training a latent-to-latent diffusion model, e.g., the second latent diffusion model of the second aspect. The method adapts the standard diffusion model training paradigm by conditioning the latent-to-latent diffusion model on low resolution latents of the video samples that the model is being trained on.

The method comprises, for each of one or more input videos in a training dataset: generating, using a first encoder model, a first latent representation of the input video in a first latent space, wherein the first latent representation is at a first resolution; and generating, using a second encoder model, a second latent representation of the input video. The second latent representation is at a second resolution that is higher than the first resolution, e.g., as described in relation to the second aspect.

The method further comprises, for each of one or more timesteps: adding, based on a noise schedule for the timestep, a noise residual (also referred to as a ground truth nose residual) to the second latent representation of the input video to generate a noisy second latent representation of the input video; processing, using a latent-to-latent diffusion model, an input set of data to generate a predicted noise residual, wherein the input set of data comprises the noisy second latent representation of the input video, the first latent representation of the input video and a representation of the timestep; and updating parameters of the latent-to-latent diffusion model based on a comparison of the predicted noise residual to the noise residual.

Systems, methods and apparatus implementing the third aspect may be realized to implement one or more of the following advantages. The training method results in a latent-to-latent diffusion model that can be used in the second aspect to generate improved videos and/or to generate videos more efficiently. The use of noise augmentation can improve texture sticking and overall sample quality.

Furthermore, the use of overlapping chunks of latents and frame conditioning to generate overlapping chunks of video can allow long and/or high-resolution videos to be generated with an improved consistency in the overlapping regions of the generated video. This can also allow long and/or high-resolution videos to be generated without exceeding the memory available to a typical tensor processing unit (TPU).

According to a fourth aspect of this specification, there is disclosed a computer implemented method of encoding visual data. The method comprises receiving input visual data comprising one or more frames of visual data. The method further comprises generating, from the input visual data, a set of padded visual data. Generating the set of padded visual data comprises, for each of the one or more of frames of visual data: generating a plurality of padding regions of pixels around the frame of visual data, wherein one or more of the padding regions of pixels comprises a reflection of a respective region of pixels in the frame of visual data around a border between said padding region of pixels and the respective region of pixels in the frame; and processing, using a machine-learning convolutional encoder model, the padded visual data to generate an encoded representation of the input visual data.

Systems, methods and apparatus implementing the fourth aspect may be realized to implement one or more of the following advantages. The use of reflect padding in the encoding and/or decoding of images can greatly reduce the discrepancy (e.g., measured in mean absolute error) between 1) encoding and decoding a video in chunks and 2) encoding and decoding a video with a single forward pass. Moreover, it helps resolve some motion artifacts and improves reconstruction performance (measured in terms of PSNR) with negligible cost in terms of memory and compute.

Furthermore, the combination of deflation with reflect padding results in an encoding that is equivalent to treating the image as a static video and applying the encoder, without requiring the image to be tiled into a static video for the computation. This reduces the computational cost, latency and/or memory usage when encoding/decoding static images using a video autoencoder.

According to a fifth aspect of this specification, there is disclosed a computer implemented method for training an autoencoder model using a latent bottleneck penalty. The resulting encoder and decoder models are particularly suited to use in diffusion model settings, such as the methods described in relation to the first to third aspects, as the resulting latents align with how pixels are represented in diffusion model processes. The resulting autoencoder model (e.g., the encoder model and/or decoder model) may be used as part of a latent diffusion process for generating videos, as described in relation to other aspects of this specification.

The method comprises: for each of a plurality of training examples, each training example comprising a video: processing, using an encoder model, the video of the training example to generate a latent representation of the video; processing, using a decoder model, the latent representation of the video to generate a reconstruction of the video; and determining an objective function value based on a comparison of the reconstruction of the video to the video of the training example. The method further comprises updating, based on the objective function values for the plurality of training examples, parameters of the encoder model and/or decoder model. The objective function comprises: a reconstruction loss that penalizes pixel value differences between the reconstruction of the video to the video of the training example; and a latent bottleneck penalty that penalizes values of the latent representation of the video that lie outside a predefined range of values.

Systems, methods and apparatus implementing the fifth aspect may be realized to implement one or more of the following advantages. The resulting encoder and decoder models are based on latent variables that live within a predefined range (e.g., a range of [−1, 1]), which aligns with how pixels are represented in pixel diffusion. This can result in improved video generation performance when the encoder/decoder models are used in a diffusion process.

According to a sixth aspect of this specification, there is disclosed a computer implemented method for generating aligned soundtracks for videos, e.g., for videos generated using any of diffusion processes described herein.

The method comprises: processing, using a machine-learned video encoder model, of an input video to generate an encoded representation of the input video; and generating, using a first audio latent diffusion model (also referred to as a base audio diffusion model) and based on a set of input data comprising the encoded representation of the input video, a first representation of accompanying audio for the input video. The first representation of the accompanying audio is at a first resolution, e.g., is a low-resolution log-mel spectrogram. The method further comprises generating, using a second audio diffusion model (also referred to as an upsampling model) and conditioned on the first representation of the accompanying audio, a second representation of the accompanying audio for the input video. The second representation of the accompanying audio for the input video is at a second resolution that is a higher resolution than the first resolution, e.g., a higher resolution log-mel spectrograph. The second audio diffusion model in effect upsamples the first representation of accompanying audio by a predefined factor, N. The method further comprises processing, using an audio decoder model, the second representation of the accompanying audio for the input video to generate an output audio waveform of the accompanying audio for the input video. The audio decoder may, for example, be a Griffin-Lim algorithm or a SoundStream-based vocoder. The audio decoder model may comprise a machine-learned audio decoder model.

Systems, methods and apparatus implementing the sixth aspect may be realized to implement one or more of the following advantages. The base audio diffusion model tackles the challenging task of mapping video and, optionally, text to audio, while the upsampling model focuses solely on enhancing detail. This can result in an improved video aligned audio.

According to a further aspect of this specification, there is described a computer program product comprising computer readable instructions that, when executed by a computer, cause the computer to perform operations comprising any one or more of the methods described herein.

According to a further aspect of this specification, there is described a system comprising: one or more processors; and a memory, the memory storing computer readable instructions that, when executed by the one or more processors, causes the system to perform operations comprising any one or more of the methods described herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 11 shows an example method of encoding visual data.

FIG. 14 shows a schematic overview of an example system for performing any one or more of the methods described herein.

FIG. 15 shows a flow diagram of an example method for generating video using a diffusion model.

FIG. 17 shows a flow diagram of an example method for encoding visual data.

FIG. 19 shows a flow diagram of an example method for generating audio for an input video.

Like reference numbers and designations in the various drawings indicate like elements.

DETAILED DESCRIPTION

This specification describes video generation systems and methods capable of synthesizing high-quality, high-resolution video, for example from a text prompt and/or an image prompt.

Diffusion is the de facto standard approach for modern image and video models, achieving state-of-the-art performance in generative media applications. The systems and methods described herein use latent diffusion, in which the diffusion process is applied in a spatio-temporal latent space. Videos can be encoded by an auto-encoder into a compressed latent representation in which learning and inference can take place more efficiently than directly with pixels. During training, a denoising network is optimized to remove noise from noisy latent vectors. This network is then iteratively applied to an input noise (e.g., Gaussian noise) and conditioning data during sampling to produce a generated video. The systems and methods described herein can also be applied to the generation of other types of visual data, such as images.

Pixel level generative models are compute and memory expensive, whereas if autoencoders are used, in which pixels can be mapped to a much lower dimensional (compressed) latent space that can be decoded back to pixel space with a good reconstruction quality, then generative models can be trained in the much lower dimensional latent space. For example, an adversarial autoencoder enables compression of fine-grained details into decompressable high-level representations, and it has been shown in multiple instances that image and video latent diffusion models can give high-quality samples.

Figure 1:
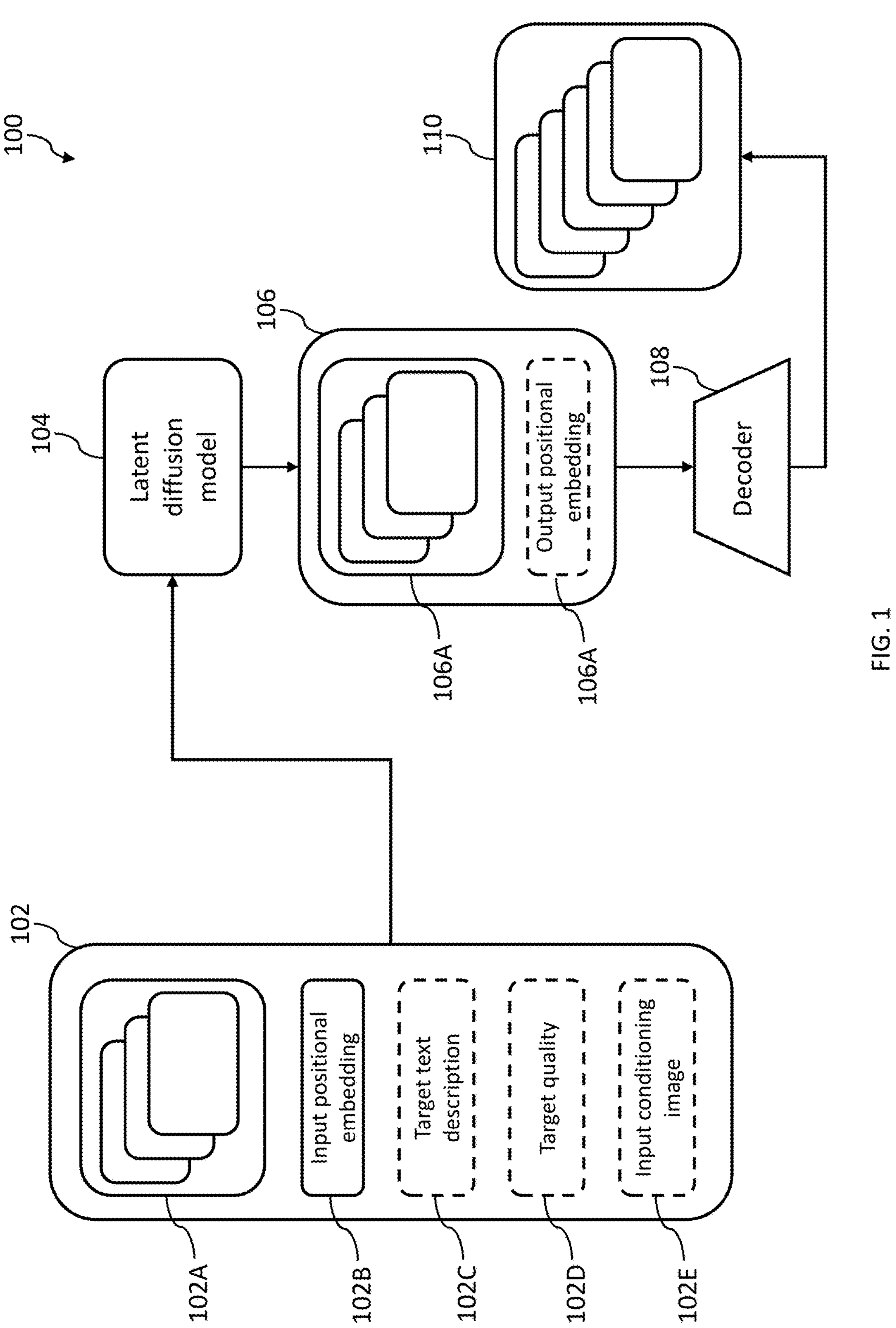
FIG. 1 shows an overview of an example method for generating video using a latent diffusion model.

FIG. 1 shows an overview of an example method 100 for generating video using a latent diffusion model. The method 100 may be performed by a system comprising one or more processors operating in one or more locations.

A set of input tokens 102 is received and input into latent diffusion model 104. The set of input tokens comprises a plurality of input video tokens 102A and an input positional embedding 102B. The latent diffusion model 104 processes the set of input tokens 102 to generate a set of output tokens 106. The set of output tokens 106 comprises a plurality of output video tokens 106A, where each video token comprises a latent representation of a respective one or more pixels of an output video 110. The set of output tokens 106 is processed by a machine-learning decoder model 108 to generate the output video 110 from the plurality of output video tokens 106A.

The plurality of input video tokens 102A includes a latent representation of a respective one or more pixels of an input video. In some examples, the video tokens comprise flattened noisy latent embeddings of video pixels, after reshaping into patches. The input video may comprise a noise video. For example, the input video tokens 102A may represent a noisy video sampled from a predefined noise distribution. The noise distribution can, for example, be a Gaussian noise distribution with, e.g., zero mean and/or a unit variance. The sampling can occur in pixel space, and an encoder model (not shown) used to generate the noisy latents. Alternatively, the sampling can occur directly in the latent space.

In some examples, the plurality of input tokens 102A alternatively or additionally comprises a plurality of latent embeddings of a given video. This can enable the latent diffusion model 104 to be used for video editing, such as video extension and/or video inpainting, and/or the latent diffusion model to be conditioned on properties of the given video, e.g., style, composition, contents, etc. In such examples, the latent diffusion model 104 can be trained to fill missing latent patches given a subset of the patches of an entire video. For example, frames of a video after an initial set can be masked, in which case the latent diffusion model 104 will learn to extend the video. In some examples, the latent tokens representing the given video are summed with respective noisy latent tokens after projection (see, e.g., FIG. 3).

The input positional embedding 102B represents a spatial and temporal position of the one or more pixels of the input video. Since the 3D structure of the video is lost after video latents are flattened, the positional embeddings 102B are used to keep track of the spatial and temporal positions of the input video tokens 102A. In some examples, a positional embedding 102B is added to each video token along each axis: time, width and height. It is worth noting that when training on a fixed video duration and video resolution, 1D positional embeddings can be used, since the latent diffusion model 104 can learn the mapping of embeddings to video positions. However, when training to generate multiple resolutions and video durations, the positional embeddings are explicitly provided, since these cannot be implicitly inferred. In some examples, a 3D version of relative positional embeddings is used as the positional embedding 102B. This can enable generalisation across sequence lengths.

In some examples, the plurality of input tokens 102 further comprises a plurality of text tokens 102C representing a description of a target video. The description of the target video can, for example, comprise a description of one or more properties of the target video, e.g., contents of the video, a style of the video, a theme for the video, or the like. The text tokens are, in some examples, generated from natural language input that comprises the description of the one or more properties of the target video. For example, a text encoder can be used to generate the text tokens, as described in relation to FIG. 2. The natural language input is, in some examples, textual input, e.g., input through a text input device, such as keyboard or touchscreen. The natural language input is, in some examples, speech input received via one or more microphones.

In some examples, the plurality of input tokens 102 further comprises a quality score token 102D indicative of a target quality for the video. The latent diffusion model 104 is conditioned on the target quality score to generate output at the target quality. In some examples, the latent diffusion model 104 is trained on a training dataset comprising videos with a wide range of quality and/or style. The signal of video quality is typically not present in the video caption or text, without an additional signal the latent diffusion model 104 will sample from the quality distribution of the training dataset at inference time, which can be undesirable. To control the sampling quality, a quality score for each of the training examples can be determined, e.g., based on a trained quality scoring model. The quality score can be embedded as a quality score token 102D that is included in the input sequence 102. At inference time, a user can input a desired quality score, which can be embedded a quality score token 102D and used to condition the latent diffusion model 104.

The quality score may be a numerical value in a predefined range of quality scores, e.g., between zero and one. Alternatively, the quality score can be a categorical value, e.g., "low quality", "high quality" or the like. At inference time, the quality score can, in some examples, be a predefined fixed value, e.g., 0.7. Alternatively, the quality score is a controllable parameter, e.g., can be input by a user.

In some examples, the plurality of input tokens 102 further comprises a plurality of input image tokens 102E representing an input conditioning image. The input conditioning image may be supplied/input by a user. For example, the user can upload a saved image to use as a conditioning image. Alternatively or additionally, the user can capture the input image using a camera of a user device. In some examples, the method further comprises generating, using an image encoder, the plurality of input image tokens from the input conditioning image, e.g., as described in relation to FIG. 2.

The latent diffusion model 104 (also referred to herein as a "latent diffusion neural network") is a machine learning model that generates output video tokens in a latent space using a diffusion process. In general, diffusion models, such as latent diffusion models 104, generate video/images by using a noise removal process. A denoising neural network is trained to estimate the level of noise in an input. After training the denoising neural network, a system can perform a reverse diffusion process using the denoising neural network to generate a new set of data, e.g., a new video/image latent.

Examples of diffusion models include latent diffusion models 104, which operate in a latent space rather than directly in a pixel space. The latent diffusion model 104 performs a diffusion process in latent space, e.g., in a latent space that is lower-dimensional than the output space (i.e., the pixel space). That is, the data items ("representations") operated on by the diffusion neural network 104 are latent representations and the values in the representations are learned, latent values, e.g., rather than pixel colour values when the data items are images.

To perform the reverse diffusion process, the system can, in some examples, receive a conditioning input, such as text input or a latent representation, such as the text tokens 106C, quality score token 106D and/or conditioning image tokens 106E described above.

To perform the reverse diffusion process, the system can initialize a representation of a new video/image by sampling noise values from a noise distribution. The system can then update the representation of the new image at each of a plurality of reverse diffusion steps. As part of the updating, at each reverse diffusion step, the system processes a denoising input for the reverse diffusion step that includes the representation of the new data being generated (e.g., a video latent) using the denoising neural network, optionally conditioned on the conditioning input, to generate a denoising output that defines an estimate of a noise component of the representation of the new data.

Optionally, the system can use classifier-free guidance at each reverse diffusion step. When using classifier-free guidance, the system processes another denoising input for the reverse diffusion step that includes the representation of the new data using the denoising neural network but not conditioned on the conditioning input to generate another denoising output. The system then combines the conditional and unconditional denoising outputs in accordance with a guidance weight for the reverse diffusion step to generate a final denoising output.

At each reverse diffusion step, the system then updates the representation of the new data using the denoising output.

For example, the system can determine an initial estimate of the final data using the denoising output and then apply an appropriate diffusion sampler, e.g., the DDPM (Denoising Diffusion Probabilistic Model) sampler, the DDIM (Denoising Diffusion Implicit Model) sampler or another appropriate sampler, to the initial estimate to update the current representation. At the last reverse diffusion step, the system can use the initial estimate as the updated representation.

After updating the representation of the new data at each of the plurality of reverse diffusion steps, the system generates the new data from the representation of the new data.

As described above, each denoising output defines an estimate of a noise component of the corresponding representation of the corresponding data. The denoising output can define this estimate in any of a variety of ways.

In some implementations, the denoising output is an estimate of the noise component of the current representation, i.e., the noise that needs to be combined with, e.g., added to or subtracted to, a final representation to generate the current representation.

In some other implementations, the denoising output is an estimate of the final representation given the current representation, i.e., an estimate of the representation that would result from removing the noise component of the current representation.

In some other implementations, the denoising output defines a predicted residual between the true noise component of the current representation and an analytic estimate of the noise component, i.e., an estimate that has been computed analytically from the current representation.

In some other implementations, the denoising output is a v-parametrization of the estimate of the noise component.

The latent diffusion model 104 can be any appropriate diffusion neural network that is configured to receive an input that includes a current (noisy) representation of an image/video latent and, optionally, a conditioning input and to generate a denoising output. In some implementations, the latent diffusion model comprises a plurality of transformer layers. One or more of the transformer layers may be global transformer layers that attend to all tokens in a respective input sequence of tokens. One or more of the transformer layers may be local transformer layers that attend to a sliding window of tokens in a respective input sequence of tokens. In some examples, the latent diffusion model 104 and decoder 108 use the two-stage processes described in relation to FIGS. 5 and 6.

The set of output tokens 106 comprises a plurality of output video tokens that represent an output video 110 in a latent space, e.g., correspond to a compressed representation of the output video 110. The latent space is, in some examples, the same latent space as the input video tokens 102A.

In some examples, the set of output tokens 106 further includes tokens representing a positional embedding for the output video tokens, e.g., a spatial and temporal position of one or more pixels of the output video that correspond to each latent. The positional embedding is, in some examples, the same as the positional embedding used in the set of input tokens 102. The positional embedding may be a relative positional embedding/encoding, e.g., a three-dimensional relative positional embedding/encoding.

The decoder model 108 (also referred to herein as a "decoder" or "decoder neural network") is a machine-learning model that receives as input the output tokens 106 and processes them to generate the output video 110. When the representations are in a latent space, the system can generate the restored video/image in the output space by processing the final representation in the latent space using the decoder neural network 108. For example, the decoder neural network 108 can be a neural network that has been pre-trained in an auto-encoder framework with an encoder neural network, for example as described in relation to FIG. 12.

During training of the latent diffusion model 104, the system can use an encoder model (also referred to as an "encoder"), e.g., one that has been pre-trained jointly with the decoder in an auto-encoder framework, to encode target videos/images in the output space to generate target representations for the diffusion model 104 in the latent space. In some implementations, during training, the diffusion model 104 can be associated with an encoder to encode training data items into the latent space and, after training and to generate new output data items, a decoder 108 that receives an input that includes a latent representation of a data item and decodes the latent representation to reconstruct the data item.

The decoder 108 is, in some examples, a convolutional decoder model comprising a plurality of convolutional layers. A convolutional layer may comprise one or more two-dimensional spatial convolutions and/or one or more one-dimensional temporal convolutions. In some examples, the decoder model 108 comprises one or more skip connections, e.g., the decoder model 108 may comprise a U-Net model. In some examples, the decoder model 108 is a decoder model of a variational autoencoder (VAE) model, where the VAE model encodes input video into the latent space of the latent representation using an encoder, then decodes the latent representation of the input video back into pixel space using the decoder model.

The output video 110 is a digital video that includes a plurality of frames, each frame including a plurality of pixels. The output video 110 includes a plurality of frames of video, e.g., T frames of video. In some examples, each frame is an image of H pixels in height and W pixels wide in C color channels (e.g., in three color channels), i.e., the video is represented by a tensor/array of pixel values of dimension (T, H, W, C).

Figure 2:
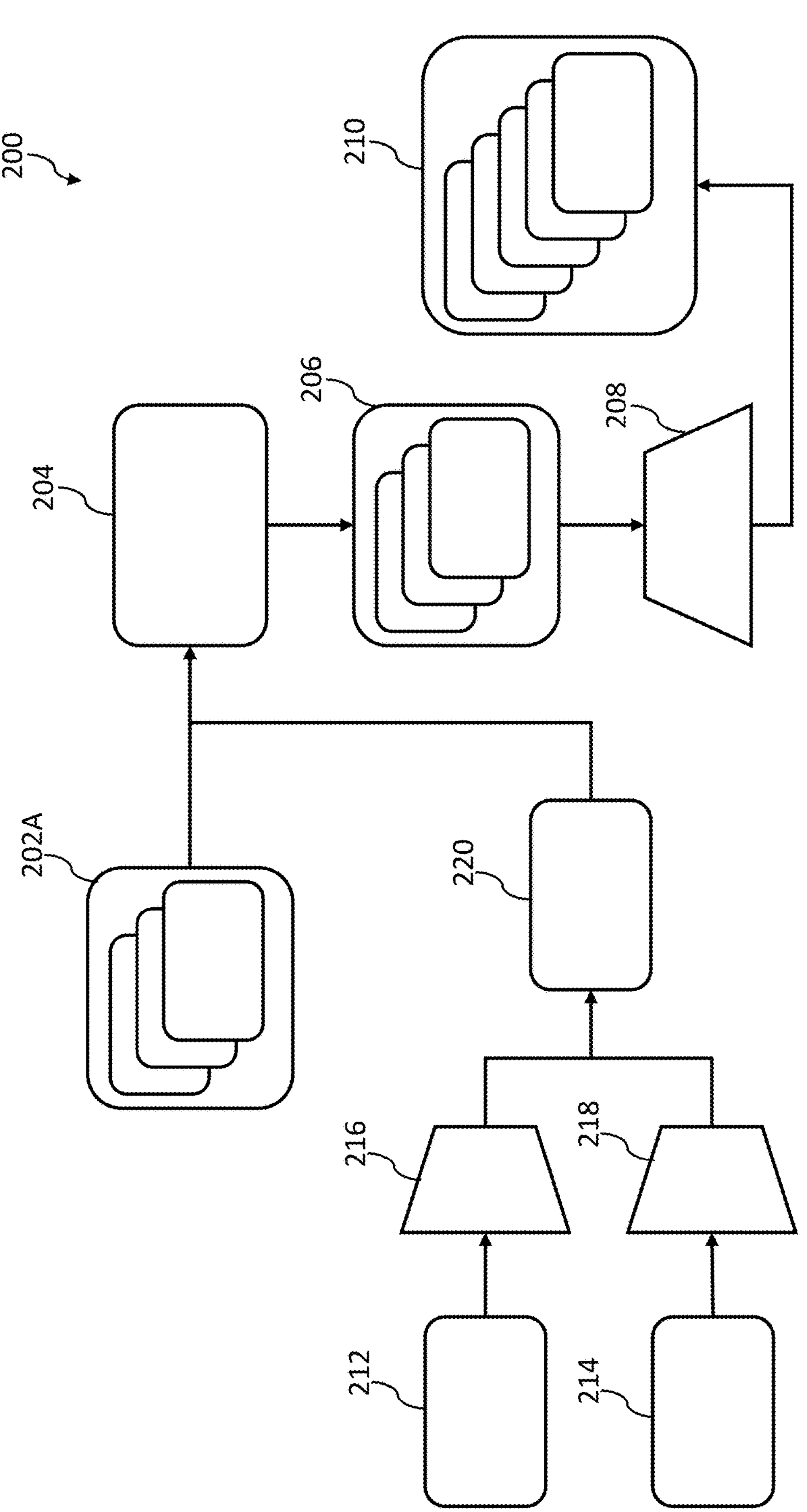
FIG. 2 shows a further example of a method for generating video using a latent diffusion model.

FIG. 2 shows a further example of a method 200 for generating video using a latent diffusion model. The method 200 may be performed by a system comprising one or more processors operating in one or more locations.

A set of input tokens is received that includes a text description 212 of one or more target video properties and/or one or more conditioning images 214. A text encoder 216 is used to generate an embedding of the input text 212. An image encoder 218 is used to generate an embedding of the conditioning image 214. If both a text description 212 and a conditioning image are present, a combined embedding 220 (also referred to as an "embedded prompt") can be generated, e.g., by concatenation. The individual embeddings, or the combined embedding 220, are input into a latent diffusion model 204 along with a latent representation of a noisy video 202A (also referred to as a "noisy compressed video"). The latent diffusion model 204 processes the input to generate a latent representation of an output video 206 (also referred to as a "compressed video"), for example as described in relation to FIG. 1. A decoder 208 is used to decode the latent representation of an output video 206 into an output video 210, for example as described in relation to FIG. 1. In effect, the text description 212 and/or one or more conditioning images 214 are used to condition the diffusion process performed by the latent diffusion model 204.

The text encoder 216 encodes the plurality of text tokens from natural language input comprising the description 212 of the target video into an embedded representation. The text encoder 216 may be a machine-learning text encoder model. An example of a text encoder 216 is the UL2 model, though any text encoder may be used.

The description 212 of the target video can, for example, include a description of one or more properties of the target video, e.g., contents of the video, a style of the video, a theme for the video, or the like. The natural language input is, in some examples, textual input, e.g., input through a text input device, such as keyboard or touchscreen. The natural language input is, in some examples, speech input received via one or more microphones. The speech input can be converted to text using a text-to-speech model. In some examples, the text input is text in a programming language. In some examples, the text input is in a markup language. In some examples, the text input is a code input.

The image encoder 218 generates the plurality of input image tokens from the input conditioning image. The image encoder 218 may be a machine-learning image encoder model, such as a contrastive image encoder model.

Figure 3:
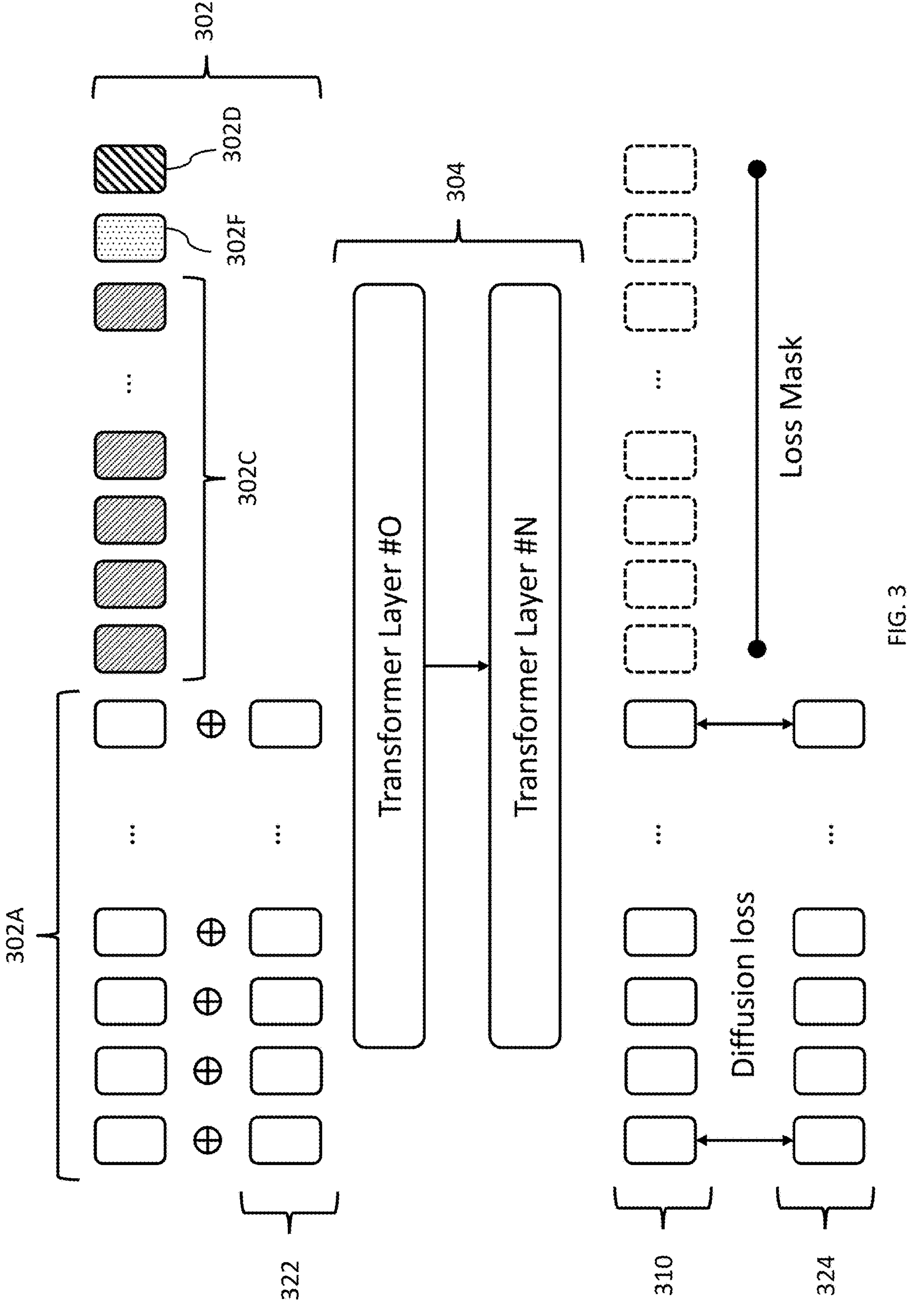
FIG. 3 shows an example of the operation of a transformer-based latent diffusion model.

FIG. 3 shows an example of the operation of a transformer-based latent diffusion model 304. The latent diffusion model 304 receives as input an input sequence of tokens 302 for the current diffusion timestep, and processes them through a plurality of transformer layers 304A, 304B to generate an output sequence of tokens 310 for the current timestep.

The input sequence of tokens 302 includes a plurality of input video tokens 302A comprising a latent representation of a respective one or more pixels of an input video, as described in relation to FIG. 1, and a timestep token 302F indicating a diffusion timestep. The input video tokens 302A include a sequence of flattened and projected latents after patching, e.g., after dividing the video into patches, p. The patched video is, in some examples, be represented by a tensor with dimensions [T, H/p, W/p, C*p*p], where T is the length of the video in frames, H is the height of the video in pixels, W is the width of the video in pixels and C is the number of color channels. The plurality of input video tokens 302A include, in some examples, positional embeddings for the video latents, as described in relation to FIG. 1.

The plurality of input video tokens 302A are, in some examples, the output video tokens in the latent space from a previous timestep in the diffusion process. For the initial timestep, the plurality of input video tokens 302A are, for example, sampled from a noise distribution.

The input sequence of tokens 302 further includes, in some examples, a sequence of text tokens 302C encoding a description of target properties of the output video, for example as described in relation to FIG. 1. In some examples, the input sequence of tokens 302 alternatively or additional includes an embedding of a quality score 302D, for example as described in relation to FIG. 1.

In some examples, the input sequence of tokens 302 further includes a plurality of given video tokens 322, e.g., a sequence of tokens representing a known input video. The tokens are in the same latent space as the input video tokens 302A. In the example shown, the number of tokens in the sequence of given video tokens 322 is the same as the number of tokens in the sequence of input video tokens 302A. It will be appreciated that the sequence of given video tokens 322 can be longer or shorter than the sequence of input video tokens 302A.

The plurality of given video tokens 322 are, in some examples, video tokens representing a conditioning video. In some examples, the plurality of given video tokens 322 are video tokens representing the final N frames of video in a previously generated video, e.g., as described in relation to FIG. 6A and FIG. 6B.

The plurality of given tokens 322 are, in some examples, combined with the input video tokens 302A prior to input to the latent diffusion model 304. For example, each of the plurality of given tokens 322 is summed with a respective input video token 302A to generate a combined video token (not shown).

Figures 4A, 4B:
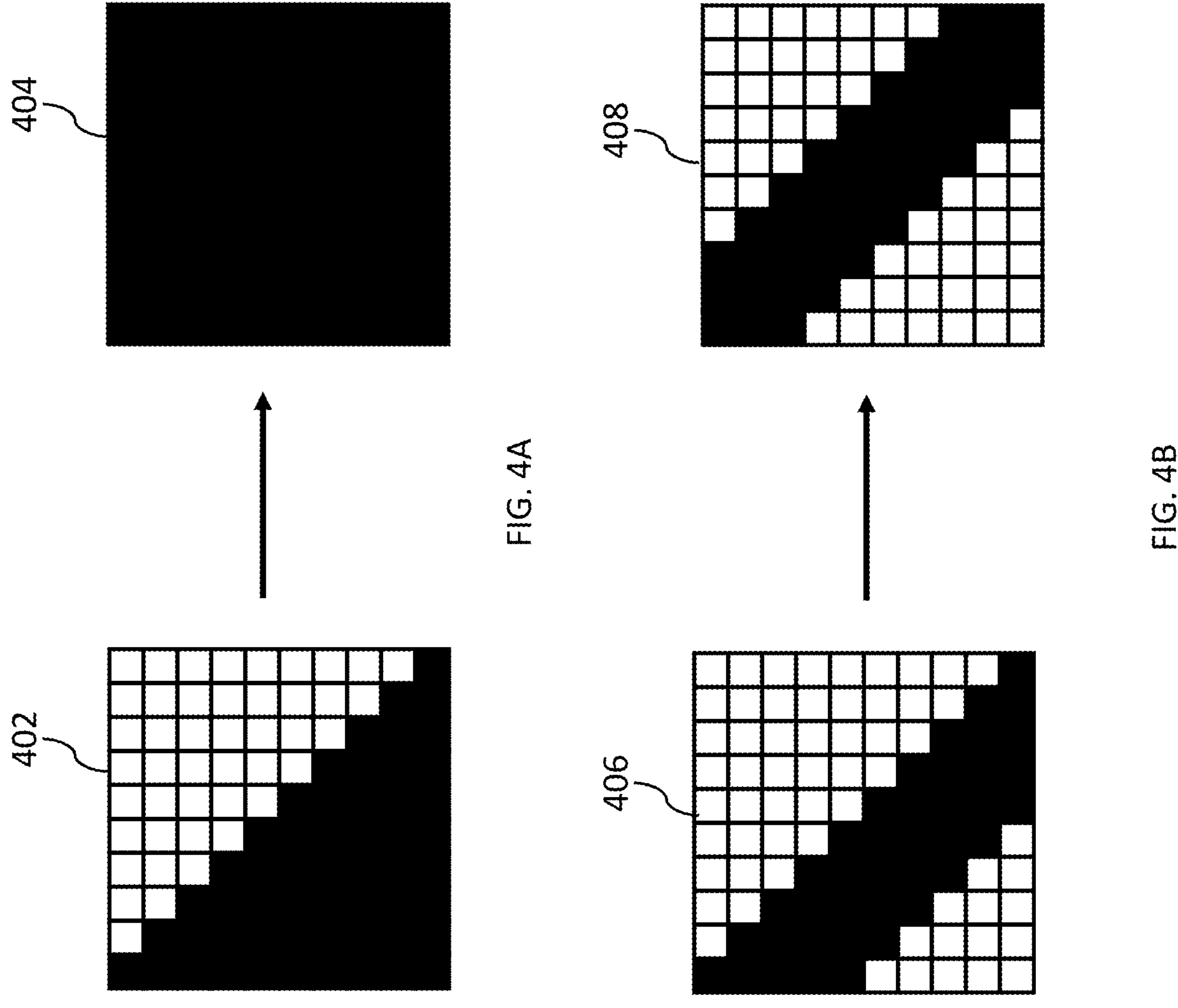
FIG. 4A shows a comparison of a typical global causal mask used in language modelling to a global mask used in some examples of video generation.
FIG. 4B shows a comparison of a typical local causal mask used in language modelling to a local mask used in some examples of video generation.

The latent diffusion model 304 includes a plurality of transformer layers 304A, 304B. The plurality of transformer layers 304A, 304B can include one or more global attention layers. A global attention layer applies attention across all of the tokens in a sequence (e.g., to all other video and conditioning tokens in the sequence), i.e., without the typical causal mask applied in language modelling. The plurality of transformer layers 304A, 304B can further include one or more local attention layers. Local attention layers use a sliding window that is smaller than the full sequence length. Local attention layers can mitigate the quadratic cost of the global attention layers. Examples of global and local attention layers are shown in FIGS. 4A and 4B respectively.

In some examples, the latent diffusion model 304 includes one or more further types of layers, e.g., one or more convolutional layers, such as 2D spatial convolutions and 1D temporal convolutions.

The latent diffusion model 304 generates an output sequence of tokens 310 for the timestep. The output sequence of tokens is, in some examples, a predicted noise residual, e.g., a prediction of the noise present in the input video tokens 302A. The predicted noise residual can be subtracted from the input video tokens 302A to generate the input video tokens 302A for the next timestep, or a final set of output tokens. Alternatively, in some examples, the output sequence of tokens 310 can be a sequence of denoised video tokens for the timestep.

During training of the latent diffusion model 304, the output sequence of tokens 310 is compared to a target sequence of tokens 324 using a loss/objective function. For example, a diffusion loss can be determined based on the output sequence of tokens 310 and the target sequence of tokens 324. Tokens in the output sequence 310 that are beyond the length of the target sequence 324 are, in some examples, masked when performing this comparison, e.g., using a loss mask. In some examples, the target sequence of tokens 324 is a ground truth noise that has been added to a ground truth sequence of video tokens to generate the input video tokens 302A.

FIG. 4A shows a comparison of a typical global causal mask used in language modelling to a global mask used in some examples of video generation. The horizontal and vertical axes represent tokens in a sequence of tokens input to an attention layer, with the sequence arranged left to right on the horizontal axis and top to bottom on the vertical axis. Black squares indicate pairs of tokens between which attention is applied, and white squares indicate pairs of tokens between which attention is not applied.

The left-hand example shows an example of a global casual attention mask 402 used in language modelling. In this example, for a given token, attention is only applied between the given token and tokens that occur earlier in the sequence of tokens (including itself). Attention is not applied between a given token and tokens that occur later in the sequence.

The right-hand example shows an example of global attention 404 applied in examples of video generation described herein. The global attention 404 applies attention between all pairs of tokens in a sequence.

FIG. 4B shows a comparison of a typical local causal mask used in language modelling to a local mask used in some examples of video generation. The horizontal and vertical axes represent tokens in a sequence of tokens input to an attention layer. Black squares indicate pairs of tokens between which attention is applied, and white squares indicate pairs of tokens between which attention is not applied.

The left-hand example shows an example of a local casual attention mask 406 used in language modelling. In this example, for a given token, attention is only applied between the given token and tokens that occur earlier in the sequence of tokens (including itself) and within a predefined window of length r tokens. Tokens that occur in the sequence before the start of the window do not have attention applied. In the example shown r=5. Attention is not applied between a given token and tokens that occur later in the sequence.

The right-hand example shows an example of local attention 408 applied in examples of video generation described herein. Attention is applied in a sliding window of length r tokens. For a given token in the sequence, the window is, in some examples, centered on that token, i.e., includes tokens that occur prior to the given token in the sequence and tokens that occur subsequent to the given token in the sequence. In the example shown, r=5, though it will be appreciated that other values of r may alternatively be used. Tokens outside of the sliding window do not have attention applied.

Figure 5:
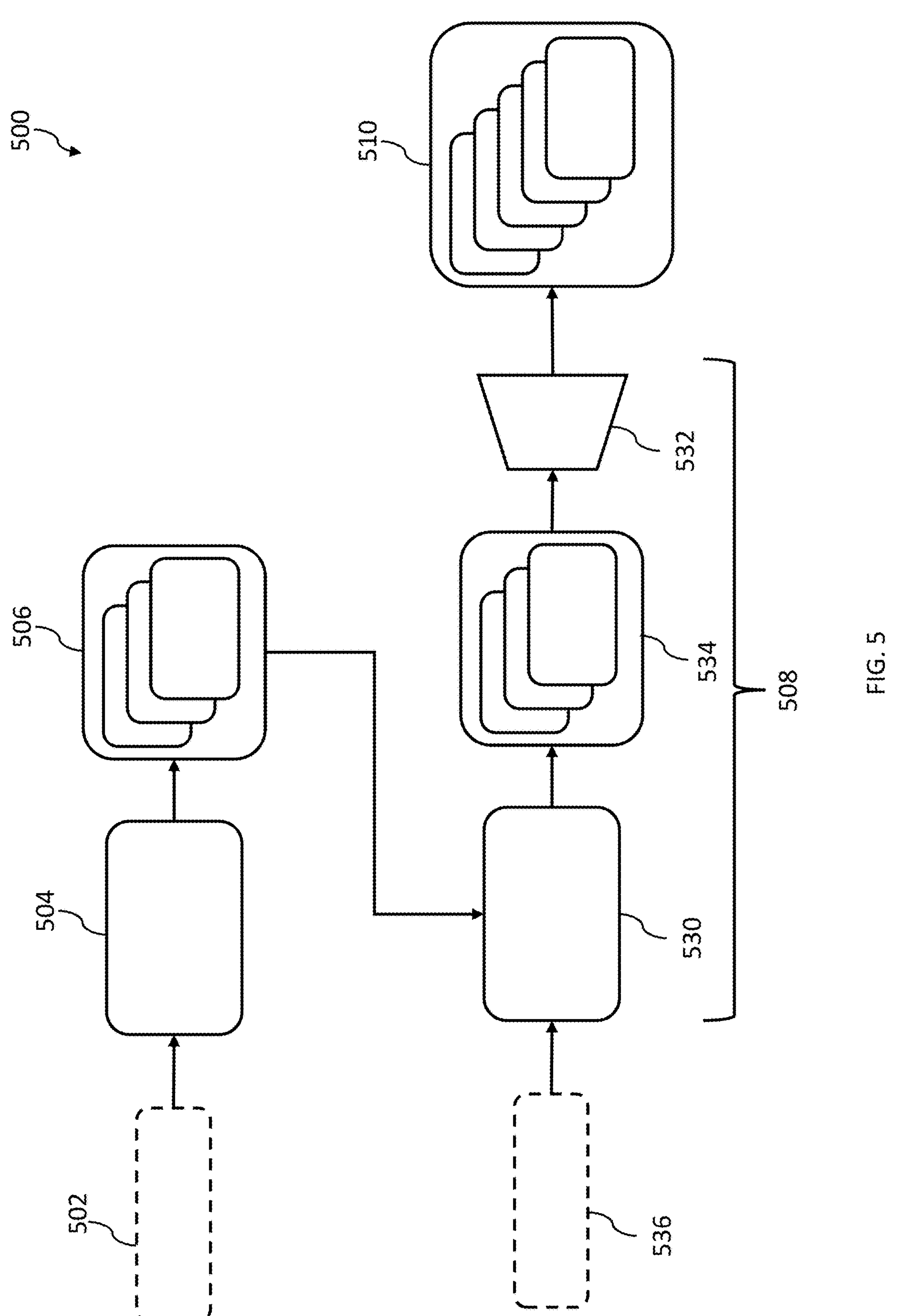
FIG. 5 shows a further example of a method of video generation using latent diffusion models.

FIG. 5 shows a further example of a method 500 of video generation using latent diffusion models. The method 500 may be performed by a system comprising one or more processors operating in one or more locations.

Decoding latent samples from a latent diffusion model back to pixels using the decoder from an autoencoder can introduce noticeable reconstruction errors due to the high compression rate. A typical problem is the lack of motion in the output video where texture is stuck across frames, referred to as texture sticking. To address this problem, a two-stage diffusion decoder model can be used. Moreover, the diffusion decoder can be used as an up-sampler so that the output video can have a higher resolution than the base latent diffusion model.

One could train a single latent-to-pixel diffusion model to decode latents in one go. However, deploying a diffusion model at the pixel level, especially in the upsampling setting, imposes a significantly large requirement for memory and computation in both training and inference time. Instead, some examples described herein follow a cascaded approach to decode latent diffusion model latents in two stages.

The method 500 uses a base latent diffusion model 504 (also referred to herein as a “first latent diffusion model”) to generate latent samples 506 (also referred to herein as “low resolution latents”) in a first latent space (referred to herein as a “low-dimensional latent space”). In some examples, the base latent diffusion model 504 receives input data 502 to condition the generation of the latent samples 506, e.g., as described in relation to FIG. 1 and FIG. 2, such as a text input that describes one or more target properties of the video being generated. A diffusion decoder 508 is used to decode the latent samples 506 into an output video 510.

For example, the first latent representation may have dimensions (T/n, H/n, W/n, p), where n is an integer and p is the number of latent channels. T is the number of frames in the output video, each of which is an image of H pixels in height and W pixels wide in C color channels (e.g., in three color channels), i.e., the video is represented by a tensor/array of pixel values of dimension (T, H, W, C).

The diffusion decoder 508 includes a latent-to-latent (L2L) diffusion model 530 (also referred to herein as a “second latent diffusion model”) and a decoder model 532 (also referred to as a “high capacity autoencoder”). The L2L diffusion model 530 samples a sequence of video tokens 534 (also referred to herein as “high resolution latents”) in a second latent space (referred to herein as a “high-dimensional latent space”) conditioned on the on latent samples 506 from the base LDM model 504. The second latent space has a higher resolution than the first latent space, e.g., has a lower compression rate. For example, the second latent representation may have dimensions (T/m, H/m, W/m, q), where m is an integer and q is the number of latent channels, where $m<n$ and $q>p$. The second latent diffusion model 530 in effect upscales the first latent representation of the video.

The L2L diffusion model 530 performs a reverse diffusion process to generate the second latent representation of the video. At each of a plurality of timesteps the L2L diffusion model processes a set of input data for the timestep to generate a denoising output for the timestep. The set of input data for the timestep comprises the first latent representation 506, a set of output data of a previous timestep (e.g., a denoised latent representation of the video in the second latent space) and a timestep embedding corresponding to the timestep. For the first timestep, the output data of the previous timestep may be a noise sample from a noise distribution. Subsequent timesteps use a denoised second latent representation generated from the denoising output for the previous timestep and the input of the previous timestep.

The set of output data for a timestep is, in some examples, generated based on the input data for the timestep and the denoising data. For example, the output data for the timestep may be generated by subtracting the denoising data from at least a part of the input data.

The L2L diffusion model 530 includes, in some examples, a downsampling branch, an intermediate block and an upsampling branch. One or more skip/residual connections may be present between layers of the downsampling branch and corresponding layers of the upsampling branch. For example, the second latent diffusion model may be a U-net model. The first latent diffusion model 504 may also be a U-Net model.

The downsampling branch is configured to process the set of input data for a timestep to generate a downsampled representation of the input data for the timestep. The downsampling branch may include one or more convolutional layers (e.g., a plurality of convolutional layers) and/or one or more transformer layers (e.g., a plurality of transformer layers). The downsampling branch includes one or more downsampling operations.

As an example, the downscaling branch may have three stages: a first stage that includes a convolutional layer; a second stage that includes a transformer layer; and a third stage that includes a further transformer layer. Each stage has a skip connection to the corresponding stage of the upsampling branch. Each stage further includes a downsampling operation, e.g., that uses a Haar resampling method or the like.

The intermediate block is configured to process the downsampled representation for the timestep to generate a set of transformed data for the timestep. The intermediate block may, for example, be a transformer block. The intermediate block may, for example, implement a self-attention mechanism, e.g., a 3D Splash self-attention. Alternatively or additionally, the intermediate block may implement a cross-attention mechanism, e.g., to condition on text input. In some examples, the intermediate block is omitted.

The upsampling branch is configured to process the set of transformed data for the timestep to generate a set of denoising data for the timestep. The upsampling branch may include one or more convolutional layers (e.g., a plurality of convolutional layers) and/or one or more transformer layers (e.g., a plurality of convolutional layers).

As an example, the upscaling branch may have three stages: a first stage that includes a convolutional layer; a second stage that includes a transformer layer; and a third stage that includes a further transformer layer. Each stage has a skip connection to the corresponding stage of the upsampling branch. Each stage further includes an upscaling operation, e.g., that uses an interpolation method or the like.

The third stage processes the set of transformed data for the timestep and the data received from the skip connection to the third stage of the downsampling branch to generate a set of output data for the third stage of the upsampling branch. The second stage processes the set of output data for the third stage of the upsampling branch and the data received from the skip connection to the second stage of the downsampling branch to generate a set of output data for the second stage of the upsampling branch. The first stage processes the set of output data for the second stage of the upsampling branch and the data received from the skip connection to the first stage of the downsampling branch to generate a set of output data for the first stage of the upsampling branch. The denoising data is generated from the set of output data for the first stage of the upsampling branch.

The one or more convolutional layers may implement one or more two-dimensional spatial convolutions, e.g., a plurality of two-dimensional spatial convolutions. The one or more convolutional layers may implement one or more one-dimensional temporal convolutions, e.g., a plurality of one-dimensional temporal convolutions.

The one or more transformer layers may implement one or more attention mechanisms. One or more transformer layers may implement a self-attention mechanism, e.g., a 3D Splash self-attention. Alternatively or additionally, one or more transformer layers may implement a cross-attention mechanism, e.g., to condition on text input. The transformer layers may use a positional encoding for tokens of their input, for example as described in relation to FIG. 1.

In some examples, the L2L diffusion model 530 can be conditioned on one or more further sets of input data 536, e.g., tokens representing a natural language description of the target video, tokens representing one or more conditioning images and/or the like, as described in relation to FIG. 1 and FIG. 2. The further sets of input data 536 may be the same as the input sets of data 502 used for the base diffusion model 104.

The decoder model 532 decodes the video sample from the second latent space back to pixels to generate the output video 510, e.g., a video of dimension (T, H, W, C). The decoder model 532 is, in some examples, a decoder model of an autoencoder model that has been trained to compress input video into the second latent space using an encoder model and to reconstruct the output video from the second latent space using the decoder model 532. Such an autoencoder model may be referred to herein as a "high-capacity autoencoder model". This autoencoder model operates in a higher dimensional latent space than a base autoencoder that encodes input video into the first latent space using a base encoder and reconstructs the input video from the first latent space using a base decoder model. As a result, the encoded tensor in the second latent space contains a lot more information than the low-resolution (low capacity) tensor in the first latent space given the same input video. Consequently, reconstructed video that used the high-capacity autoencoder has fewer artefacts than reconstructed video that used the base autoencoder. This puts most modelling pressure on to the more capable L2L diffusion model 530 and avoids accumulating errors along the cascaded approach.

Figure 12:
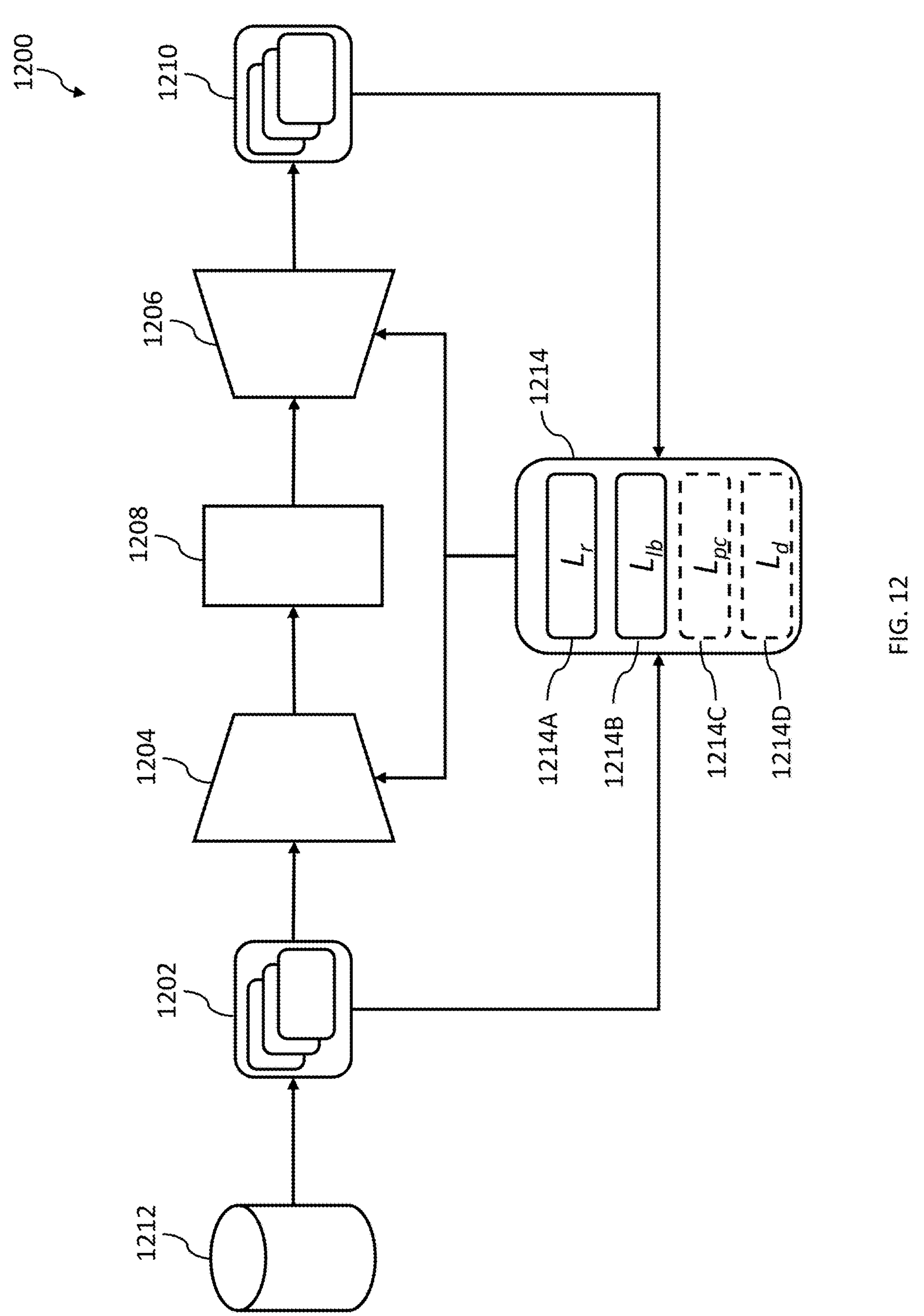
FIG. 12 shows an example method of training an auto-encoder model using a latent bottleneck penalty.

The high capacity autoencoder and base autoencoder can, for example, be trained using any of the methods described in relation to FIG. 12.

Note that if too many hidden channels are used near the outputs for the high-res AE decoder, memory usage can be very high when targeting a high number of frames at, e.g., 1080p resolution or beyond. Hence the number of hidden channels of the high-res AE decoder can be restricted to a fixed number, such that the largest activations of the decoder have shape [T, H, W, fixed number].

To decode long videos with the diffusion decoder, the latent frames 106 can be split into chunks, since it may not be possible to fit the decoding of all frames into memory, e.g., a TPU memory. Naively running the diffusion decoder on chunks of latents and concatenating the outputs can lead to clear boundary artifacts, which manifest as jumps between the frames corresponding to different chunks of latents. Using overlapping chunks and averaging the output at the overlap does not work either, as the averaging causes notable blurring at the overlap instead of smoothly interpolating the two output chunks.

A solution to this problem is to use (latent) frame conditioning, where the diffusion decoder is conditioned on the first N (e.g., N=2) high-res latent frames from a previously generated chunk to generate the rest of the latents for a chunk. The frame conditioning model can be finetuned from a pretrained L2L model. At training time, the model can use N latent frames with probability p and no latent frames with probability 1−p.

At sampling time, multiple chunks are iteratively generated in sequence by conditioning on the N high-res latents of the previously generated chunk. Low-res latents 508 output from the base diffusion model 506 are converted to high-res latents 534 via the diffusion decoder 530, which gets mapped to pixel frames 510 via the high-res AE decoder 532. The decoded chunks of pixels are smoothly interpolated at the overlap to generate the final video.

For example, for upsampling to very large videos with target size [T, H, W, 3] where a whole frame of video cannot be decoded at once due to memory constraints (e.g., 4k resolution), the diffusion decoder can be run on overlapping spatial chunks, using the frame conditioned decoding to generate high-res latent chunks. Then these high-res latent chunks can be merged with interpolation on the overlap, to create high-res latents. These latents can then, in some examples, be split into overlapping spatiotemporal chunks, separately decoded using the high-res AE decoder. The resulting pixels can be merged together on the overlaps, again with smooth interpolation.

Figures 6A, 6B:
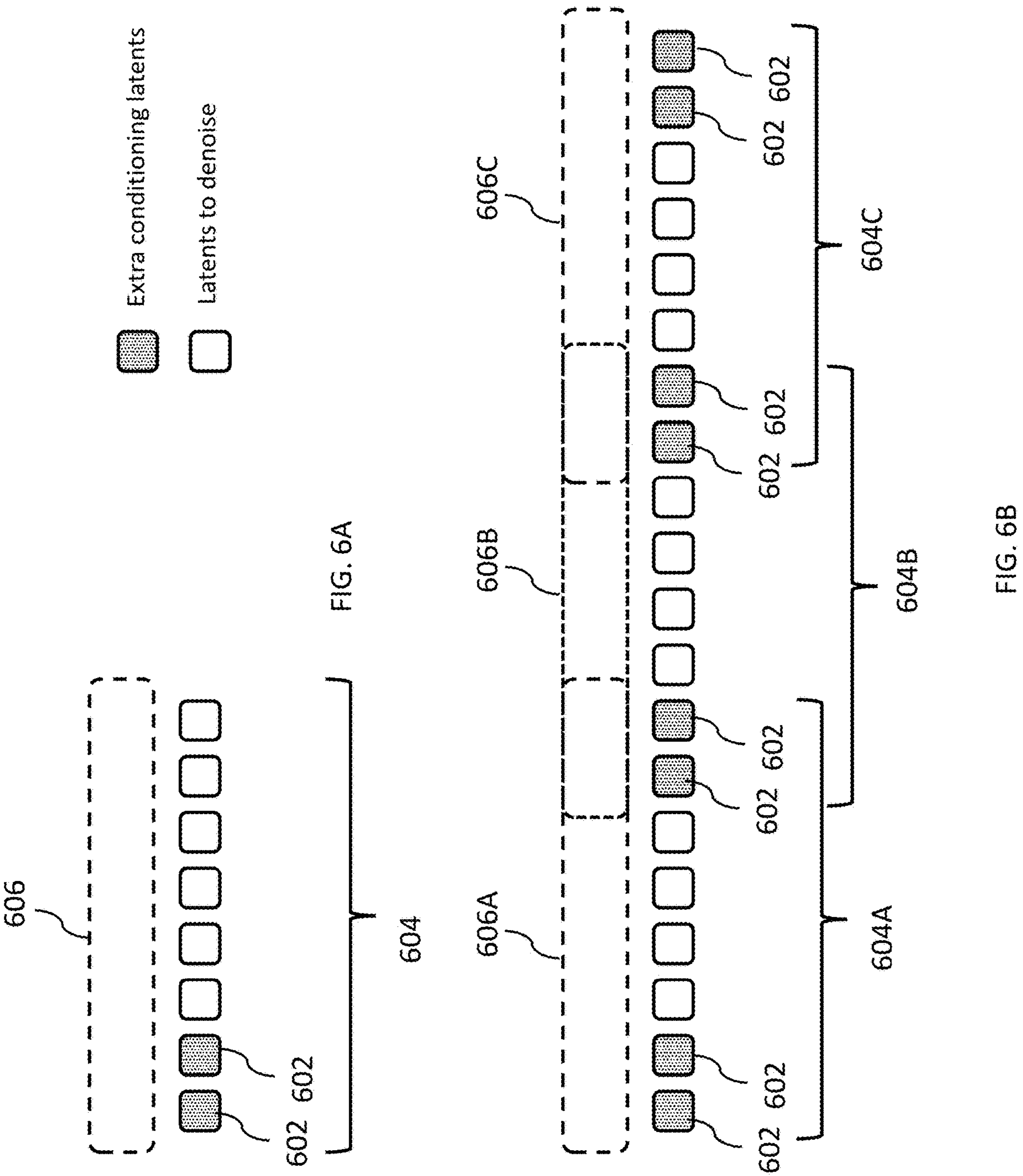
FIG. 6A shows an example of frame conditioning during training of a latent diffusion model.
FIG. 6B shows an example of frame conditioning during inference by a latent diffusion model.

FIG. 6A shows an example of frame conditioning during training of a latent diffusion model. During training of a L2L diffusion model (e.g., as described in relation to FIG. 7), the L2L diffusion model may be conditioned on one or more latents 602 (also referred to as "conditioning latents" or "extra frame conditioning") of the ground truth video when generating a candidate chunk of video latents 604 that correspond to a set of pixels 606. The extra frame conditioning may correspond to the first N latents in the sequence of latents being generated, where N≥1 frames of the preceding chunk of latents. N may, for example, be in the range [1, 4], e.g., N=2. In some examples, conditioning latents 602 are used in a forward pass through the L2L diffusion model with probability p, i.e., not included with a probability of 1−p. This can allow the L2L model to be used both with and without frame conditioning.

FIG. 6B shows an example of frame conditioning during inference by a latent diffusion model. A sequence of chunks of latents 604A, 604B, 604C are generated that represent respective chunks/sets of pixels 606A, 606B, 606C in a generated video. The chunks of pixels 606A, 606B, 606C corresponding to the latents 604A, 604B, 604C overlap spatially and/or temporally. Each chunk of latents 604A, 604B, 604C includes a sequence of latents. When generating a chunk of latents 604A, 604B, 604C, the L2L diffusion model may be conditioned on latents 602 that correspond to an overlapping section of pixels, e.g., the last N latents of the previously generated chuck of latents are used to condition the generation of the current chuck on latents. The resulting generated latent chunks can be merged in the sections where they overlap using interpolation.

In other words, for large videos (e.g., long videos and/or videos with a high temporal and/or spatial resolution) a chunk-based generation process may be used. The latents and/or video may be generated in overlapping spatial, temporal and/or spatio-temporal chunks that can be merged together using interpolation. In such examples, to improve consistency and reduce artifacts when combining the chunks, the latent-to-latent diffusion model can be conditioned on overlapping frames of a previously generated chunk of latents in the second latent space, e.g., the last N≥1 frames of the preceding chunk of latents. N may, for example, be in the range [1, 4], e.g., N=2

In such examples, a first latent representation (i.e., the latent representation generated by the base latent diffusion model) may comprise a plurality of first latent chunks of the video in the first latent space. Each first latent chunk in the first latent space corresponds to a respective chunk of video being generated that overlaps with one or more other chunks of video, spatially and/or temporally. Generating, using the L2L diffusion model and conditioned on the first latent representation, the second latent representation of the video in the second latent space can include: processing, using the second latent diffusion model, each first latent chunk to generate a respective second latent chunk in the second latent space. Each second latent chunk in the second latent space corresponds to a respective chunk of video that overlaps with one or more other chunks of video, i.e., corresponds to the same chunk of video as the first latent representation from which it was generated.

The second latent chunks are, in some examples, merged to generate the second latent representation in the second latent space. For example, an interpolation method can be used to merge the overlapping parts of the second latent representation, i.e., the parts (frames) of the second latent representations that correspond to overlapping parts of their respective video chunks.

In some implementations, processing, using the second latent diffusion model, a first latent chunk to generate the respective second latent chunk in the second latent space is conditioned on one or more frames of a previously generated overlapping second latent chunk.

In some implementations, processing, using the machine-learning decoder model, the second latent representation of the video to generate the output video in pixel space comprises splitting the second latent representation into a plurality of spatio-temporal chunks of latents. Each spatio-temporal chunk overlaps with one or more other spatiotemporal chunks, i.e., has one or more frames in common with each of one or more other spatiotemporal chunks.

Each spatiotemporal chunk of latents is processed using the machine-learning decoder model to generate a respective chunk of output video data in pixel space. The method may further comprise merging the chunks of output video data to generate the output video in pixel space. Merging the chunks of output video data to generate the output video in pixel space comprises performing interpolation on overlapping frames of the chunks of output video data.

The use of overlapping chunks of latents and frame conditioning to generate overlapping chunks of video can allow long and/or high-resolution videos to be generated with an improved consistency in the overlapping regions of the generated video. This can also allow long and/or high-resolution videos to be generated without exceeding the memory available to a typical tensor processing unit (TPU).

Figure 7:
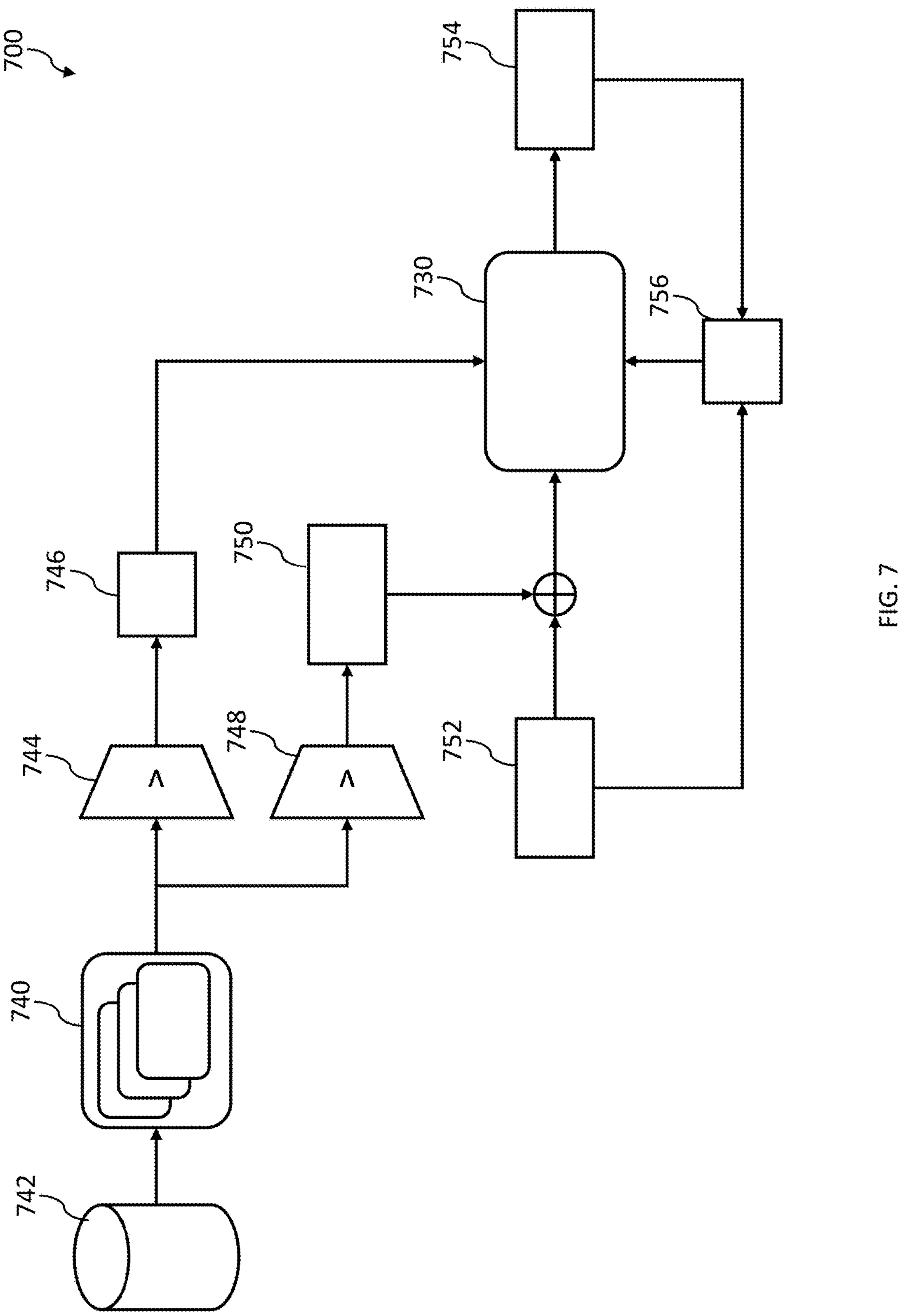
FIG. 7 shows an example of a method for training a latent-to-latent diffusion model.

FIG. 7 shows an example of a method 700 for training a latent-to-latent diffusion model. The method 700 may be performed by a system comprising one or more processors operating in one or more locations. The L2L diffusion model 730 may correspond to the L2L diffusion model 530 described in relation to FIG. 5. The method adapts the standard diffusion model training paradigm by conditioning the latent-to-latent diffusion model on low resolution latents of the video samples that the model is being trained on.

For each training video 740 in a training dataset 742, a first encoder model 744 (e.g., a base encoder model) generates a first latent representation 746 of the training video 740 in a first latent space and a second encoder model 748 (e.g., a high capacity encoder model) generates a second latent representation 750 of the training video 740 in a second latent space. The first latent space has a first resolution. The second latent space has a second resolution that is higher than the first resolution.

The training dataset includes a plurality of training videos 740. The plurality of training videos can include training videos at a variety of temporal lengths and/or spatial resolutions.

For one or more timesteps, a noise residual 752 (also referred to as a ground truth noise residual) is added to the second latent representation 750 based on a noise schedule for the timestep to generate a noisy second latent representation of the input video. A latent-to-latent diffusion 730 model processes input data that includes the noisy second latent representation of the input video, the first latent representation 746 of the input video and a representation of the timestep to generate a predicted noise residual 754 for the timestep. The predicted noise residual 754 is compared to the noise residual 752 for the timestep, e.g., using a loss function 756, and parameters of the latent-to-latent diffusion model 730 are updated based on a comparison.

The comparison of the predicted noise residual to the noise residual may be based on a loss/objective function, such as an L2 loss between the predicted noise residual and the noise residual. The parameter updates may be determined by applying an optimization routine, such as stochastic gradient descent, to the loss/objective function. The method may be iterated until a threshold condition is satisfied, e.g., a threshold performance on a test dataset and/or a threshold number of training iterations/epochs.

In some examples, a noise augmentation scheme is applied to the first latent representations 746 used during training. In such examples, generating, using the first encoder model, the first latent representation of the input video in the first latent space includes: processing the input video using the first encoder model to generate an initial first latent representation of the input video in the first latent space; generating, based on a noise augmentation schedule, a set of noise for an augmentation timestep; and generating the first latent representation of the input video in the first latent space by combining the set of noise for the timestep with the initial first latent representation of the input video. In other words, noise is added to the first latent representation based on a noise augmentation schedule that is controlled by an augmentation timestep (which is, in general, distinct from the diffusion timestep).

In some examples, generating the first latent representation of the input video in the first latent space by combining the set of noise for the augmentation timestep with the initial first latent representation of the input video may include performing, with a predefined probability, a weighted sum of the set of noise for the augmentation timestep and the initial first latent representation of the input video, wherein weights of the weighted sum depend on the augmentation timestep. For example, the initial first latent representation of the input video is modified with noise with a probability p, or not modified with a probability 1−p.

The weighted sum is, in some examples, given by:

$$x = \cos\cos(\pi t/2)x_0 + \sin\sin(\pi t/2)\epsilon$$

where x is the first latent representation of the input video, $x_0$ is the initial first latent representation of the input video, $\epsilon$ is the set of noise for the augmentation timestep, and t is the time for the augmentation timestep.

In some examples, the latent-to-latent diffusion model 730 is conditioned on the augmentation noise, i.e., the input set of data for a timestep further comprises the set of noise for an augmentation timestep.

In some implementations, the input set of data for a timestep further comprises an initial one or more frames of the second latent representation of the input video, i.e., the latent-to-latent diffusion model is conditioned on the first N frames of the second latent representation, where N≥1. N may, for example, be in the range [1, 4], e.g., N=2. This can train the model to be conditioned on overlapping latent chunks, as described in relation to FIGS. 6A and 6B.

Figure 8:
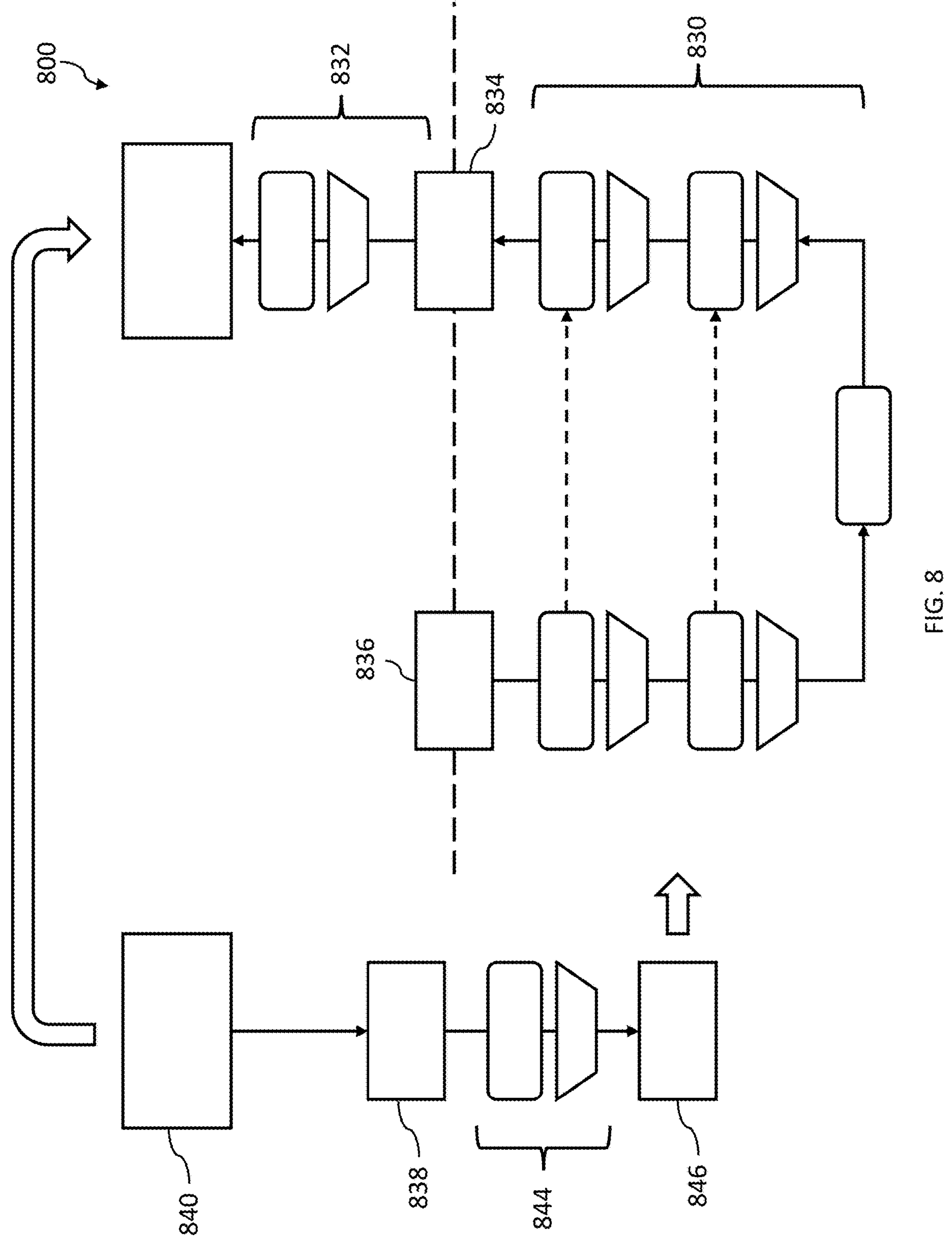
FIG. 8 shows example methods for training and inference using a latent diffusion model.

FIG. 8 shows example methods 800 for training and inference using a latent diffusion model. The methods 800 may be performed by a system comprising one or more processors operating in one or more locations.

During training, randomly sampled video patches 840 are obtained from a training dataset. The encoder of a high-resolution AE maps the randomly sampled video patches to high-resolution latent targets (not shown). The randomly sampled video patches 840 may be downsampled (e.g., 2× spatially downsampled) to generate a downsampled video patch 838, which are mapped through the encoder 844 of low-res AE (i.e., the base AE) to get low-res latent inputs 846. These low-resolution latent inputs 846 are used to condition the L2L diffusion 830 model during training; at inference time the L2L diffusion 830 model is conditioned on low-res latent inputs generated by a base latent diffusion model.

The L2L diffusion model 830 generates a set of output latents 834 from high-resolution noisy latents 836 conditioned on the low-resolution latent inputs 846. During training, the set of output latents 834 is compared to the corresponding high-resolution latent targets using, e.g., a loss/objective function, and parameters of the L2L diffusion model are updated based on the comparison. At inference time, a decoder 832 of the high-resolution AE maps the set of output latents 834 to an output video 810.

In the upsampling setting, the high-capacity AE compression rate is kept, and the L2L model 830 is trained with a higher tensor upscaling setting. Take a spatial 2× upsampling setting for example, the low-resolution latents are encoded from 2× down-sampled videos. The corresponding output/input spatial dimension of L2L model 830 is calculated as U*8/4 where U is the upsampling rate. With U=2, the L2L is responsible for a (16/4)*(16/4)*(8/4)*(8/4)=64× tensor scaling task. While this example is discussed in the context of spatial upsampling by a factor of two, it is equally applicable to other upsampling factors and/or to temporal upsampling.

In some examples, a UViT architecture is used for the L2L diffusion model 830. It involves 3 downsampling stages. High-resolution noisy latents 836 and (resized) conditioning low-resolution latents 846 are first embedded into a space through a factorized spatial and temporal embedding level. Convolutional residual blocks are used in the first stage, and transformer blocks in the second and third stage as well as the horizontal transformer block. At every down-sampling block, the spatial resolution is reduced with a Haar resampling method and the number of channels doubled. Every block in the vertical downsampling path in the figure above emits a horizontal skip connection that is consumed by the corresponding block in the upsampling path.

A scalar diffusion time conditioning signal is, in some examples, fed into every block through FiLM. In some examples, in every convolutional block, an MLP block is used followed by a spatial 2D-conv layer and a temporal 1D-convolutional layer. In the transformer block, splash self-attention can be used with 3D ROPE positional encoding and local windows. In some examples, a cross-attention layer is included to condition on text. The combination of conv-layers and local 3D ROPE positional encoding ensures the translational invariance of the UViT model with respect to the input latents. That allows the model to be trained in cropped videos and applied to larger and longer videos at inference time.

The same parameterization of the diffusion process as the base resolution LDM can be used.

In some examples, noise augmentation is used. Noise augmentation can be useful for improving texture sticking and overall sample quality. The noise augmentation follows the forward pass of a diffusion process with cosine schedule with probability p, i.e., with probability p, the low-res-latent $x_0$ is kept constant. Otherwise, we map $x_0$ to cos cos $(\pi t/2)x_0$+sin sin $(\pi t/2)\epsilon$ where t~U[0, 0.25]. Note that the diffusion time t in the noise augmentation is an independent random sample from that in the main diffusion process.

Figure 9:
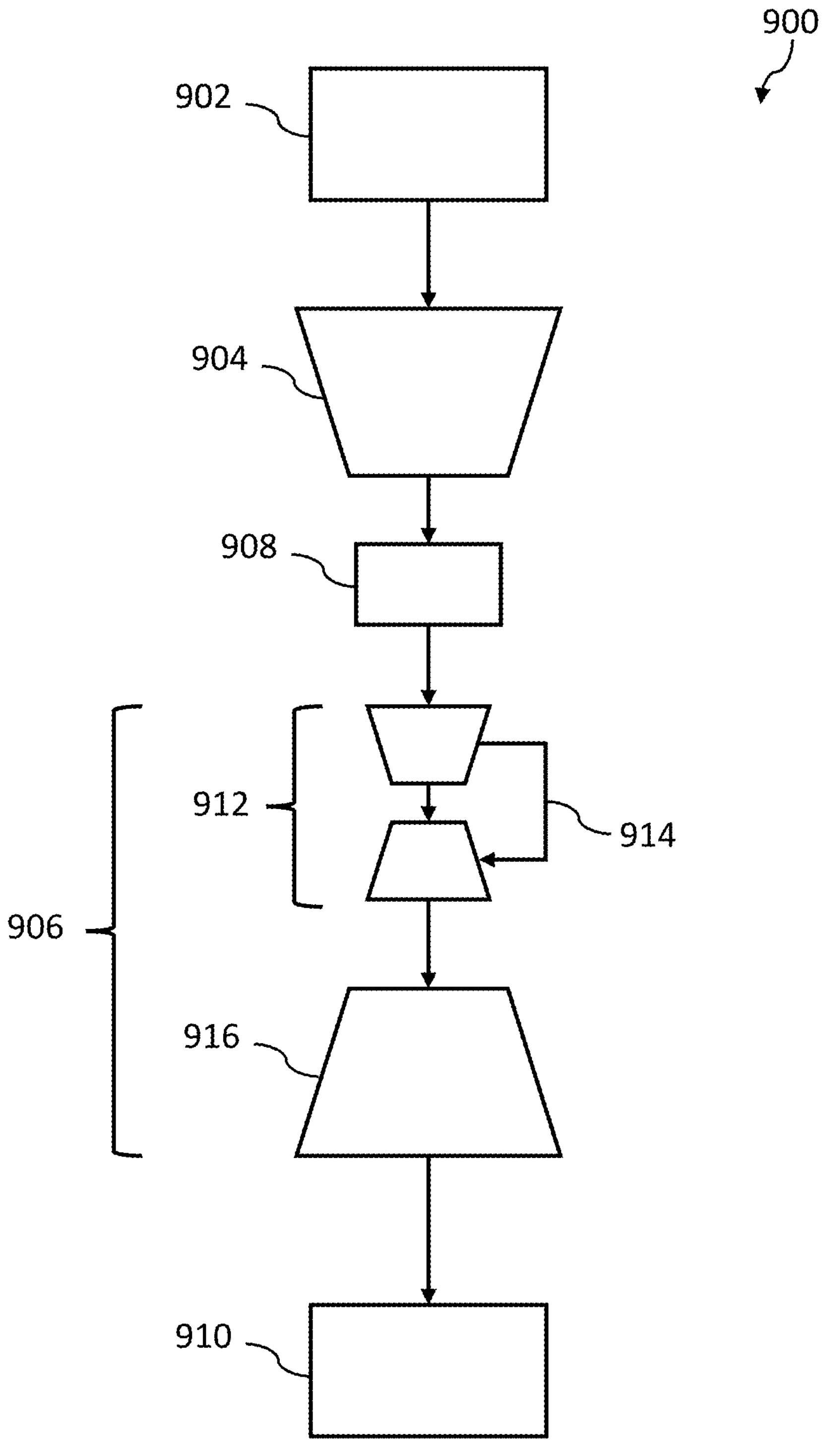
FIG. 9 shows an example of an autoencoder structure.

FIG. 9 shows an example of an autoencoder structure 900. The autoencoder includes an encoder 904 and a decoder 904. The encoder 904 takes as input visual data 902 and processes it to generate an encoded representation 908 (also referred to as a "compressed representation") of the input visual data 902. The decoder 906 takes as input the encoded representation 908 and processes it to generate reconstructed visual data 910.

The visual data 902 is, in some examples, an image. The image may be represented by a tensor of pixel values of dimensions [H, W, C], where His this height of the image in pixels, W is the width of the image in pixels, and C is the number of color channels in the image. The visual data 902 is, in some examples, a video. The video may be represented by a tensor of pixel values of dimensions [T, H, W, C], where Tis the number of frames in the video, H is this height of a frame in pixels, W is the width of a frame image in pixels, and C is the number of color channels in the image.

Figure 10:
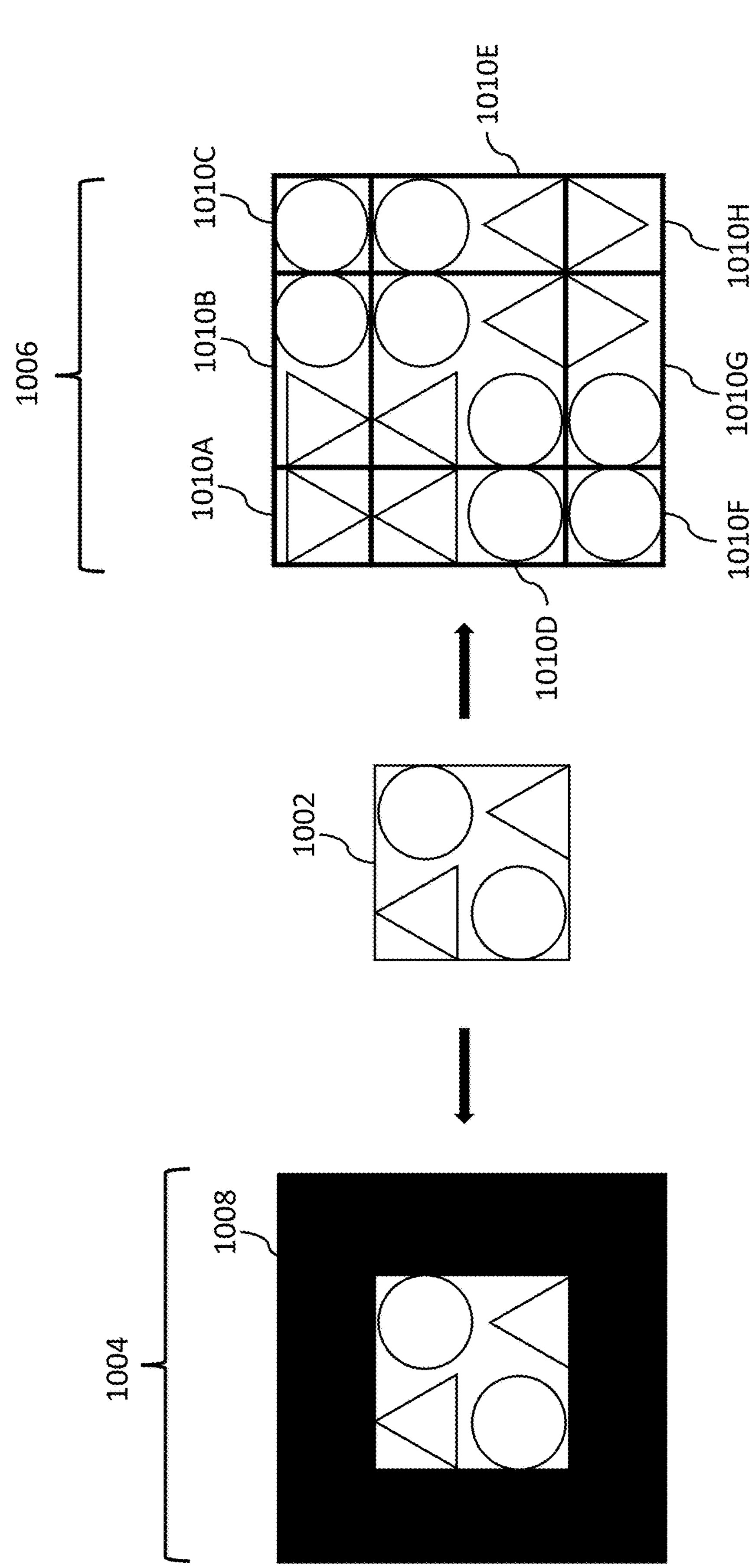
FIG. 10 shows a comparison of a zero padded image/video frame and a reflect padded image/video frame.

The visual data 902 may be padded prior to input into the encoder model, e.g., as described in relation to FIG. 10.

The encoder 904 is a machine-learning model (e.g., a neural network model) that takes as input visual data 902 and processes it to generate an encoded representation 908. In some examples, the encoder 904 includes one or more factorized spatial and/or temporal convolutions. The encoder 904 includes, in some examples, one or more downsampling layers. The downsampling layers may be implemented using one or more strided convolutions. In some examples, the encoder 904 includes one or more spatio-temporal residual stacks, e.g., convolutional blocks with residual connections.

The decoder 906 includes, in some examples, a UNet 912 that includes one or more skip connections 914. The UNet 912 may include factorized spatial and temporal convolutions. The UNet 912 performs downsampling by strided convolutions and upsampling using nearest-neighbours. The decoder 906 further includes, in some examples, a convolutional decoder 916 that decodes the output of the UNet 912 into the reconstructed visual data 910. The convolutional decoder 916 includes one or more upsampling layers. The upsampling layers may perform upsampling by nearest neighbors. The convolutional decoder 916 may include factorized spatial and temporal convolutions. The convolutional decoder 916 may include spatio-temporal residual stacks, e.g., convolutional blocks with residual connections.

In some examples, the only parameterized layers in the encoder 904 and decoder 906 are 2D convolutions in space, 1D convolutions in time and the layer norms; i.e., a fully convolutional architecture (e.g., no attention is applied). The locality of convolutions allows the encoder/decoders to encode almost any resolution and number of frames. In some examples, the only constraint is that the input resolution in each dimension should be evenly divisible by $2^K$ where K is the number of upsampling steps of that dimension. Note that the number of upsampling steps in the decoder 906 is greater than the number of downsampling steps in the encoder 904 due to the UNet 912 in the decoder 906 that contains extra up/downsampling operations.

In some examples, the encoder 904 and/or decoder 906 are configured to process both images and video data. To deal with images and video, an approach based on deflation can be used. Note that the only complication arises with applying the 1D temporal convolutions, as all other layers (2D spatial convolutions, layernorm, nonlinearities, etc.) operate independently of the time index. When dealing with image inputs to the AE, the weights of the 1D temporal convolution are summed and the biases of the 1D temporal convolution are summed to apply a pointwise linear transformation to the image input to the convolutional layer. Together with applying reflect padding, this is equivalent to treating the image as a static video and applying the auto-encoder, except that there is no need to tile the image into a static video for the computation. This has the advantage that images and video conveniently live in the same latent space. However a flip side disadvantage is that a downstream LDM cannot distinguish between image latents and video latents with a single latent frame. This can be addressed by having a conditioning signal for the LDM indicating whether a given latent is an image or a video.

FIG. 10 shows a comparison of a zero padded image/video frame 1004 and a reflect padded image/video frame 1006. An input 1002 to a convolutional layer of a neural network is often padded to ensure that the spatial dimensions of the input are correct in the output.

Typically, zero padding is used, as shown on the left. This adds a border 1008 to the input 1002 that is filled with zeros, indicated in the FIG. by a solid black fill.

Instead of using zero padding for our convolution operations, some examples described herein use pixels of the input 1004 at the boundaries and reflect them. This is referred to herein a reflect padding 1006. This can greatly reduce the discrepancy (measured in mean absolute error) between 1) encoding and decoding a video in chunks and 2) encoding and decoding a video with a single forward pass. Moreover it can help resolve some motion artifacts and improves reconstruction performance (measured in terms of PSNR) with negligible cost in terms of memory and compute.

The size of each padding region may be based on the size of one or more convolutional filters of the machine-learning convolutional encoder model, e.g., be a strip of (N−1) pixels wide or high, where N is the width/height of the convolutional filter. The reflect padding regions may replace zero padding regions that would otherwise be used.

In detail, a reflect padded input 1006 includes a plurality of padding regions 1010A-H of pixels around an input frame 1002 of visual data.

The plurality of padding regions of pixels around the frame of visual data includes, in some examples, an upper padding region 1010B includes a strip of pixels (also referred to herein as a first strip of pixels) that includes a reflection of a corresponding strip of pixels along the top of the frame. The reflection is around the top edge of the frame, i.e., a strip of pixels along the top of the frame is reflected around the boundary at the top of the frame to generate the upper padding region.

The plurality of padding regions of pixels around a frame of visual data may alternatively or additionally include a lower padding region 1010G that includes a strip of pixels (also referred to herein as a second strip of pixels) comprising a reflection of a corresponding strip of pixels along the bottom of the frame. The reflection is around the bottom edge of the frame, i.e., a strip of pixels along the bottom of the frame is reflected around the boundary at the bottom of the frame to generate the lower padding region.

The plurality of padding regions of pixels around a frame of visual data may alternatively or additionally include a left padding region 1010D that includes a strip of pixels (also referred to herein as a third strip of pixels) that includes a reflection of a corresponding strip of pixels along the left of the frame. The reflection is around the left edge of the frame, i.e., a strip of pixels along the left of the frame is reflected around the boundary at the left of the frame to generate the left padding region.

The plurality of padding regions of pixels around a frame of visual data may alternatively or additionally include a right padding region 1010E comprising a strip of pixels (also referred to herein as a fourth strip of pixels) that includes a reflection of a corresponding strip of pixels along the right of the frame. The reflection is around the right edge of the frame, i.e., a strip of pixels along the right of the frame is reflected around the boundary at the right of the frame to generate the right padding region.

Any combination of the top 1010B, bottom 1010G, right 1010E and left 1010D padding regions may be used. For example, the set of padded visual data 1006 may include all four padding regions. Alternatively, the set of padded visual data 1006 may have two of the padding regions, e.g., the top 1010B and bottom 1010G padding region, or the left 1010D and right 1010E padding regions.

The plurality of padding regions of pixels around the frame of visual data may further comprise one or more (e.g., four) corner padding regions 1010A, 1010C, 1010F, 1010H. Each corner padding region comprising a respective reflection of at least a part of: the upper padding region 1010B, the lower padding region 1010G, the left padding region 1010D and/or the right padding region 1010H.

For example, an upper-right corner region 1010C may be a reflection of a part of the upper padding region 1010B (or, equivalently, the right boundary region 1010E), where the reflection is around the border between the upper-right corner region and the upper (or right) padding region. An upper-left corner region 1010A may be a reflection of a part of the upper padding region 1010B (or, equivalently, the left boundary region 1010D), where the reflection is around the border between the upper-left corner region and the upper (or left) padding region. A lower-right corner region 1010H may be a reflection of a part of the lower padding region 1010G (or, equivalently, the right boundary region 1010E), where the reflection is around the border between the lower-right corner region and the lower (or right) padding region. A lower-left corner region 1010F may comprise a reflection of a part of the lower padding region 1010G (or, equivalently, the left boundary region 1010D), where the reflection is around the border between the lower-left corner region and the lower (or left) padding region.

FIG. 11 shows an example method 1100 of encoding visual data. The method 1100 may be implemented by one or more processors operating in one or more locations. The method 1100 may be used as the encoding method for any of the methods described herein.

The method 1100 includes receiving input visual data 1102 that includes one or more frames of visual data. The visual data may be image data (e.g., a tensor of pixel values of size (H, W, C), where H is the height of the image in pixels, W is the width of the image in pixels and Cis the number of color channels. An image may be referred to as a single frame) or video data (e.g., a tensor of pixel values of size (T, H, W, C), where Tis the number of frames in the video, H is the height of a frame in pixels, W is the width of a frame in pixels and C is the number of color channels).

The method 1100 further includes generating, from the input visual data, a set of padded visual data 1104. The method 1100 further includes processing, using a machine-learning convolutional encoder model 1104, the padded visual data to generate an encoded representation 1108 of the input visual data 1102.

Generating the set of padded visual data 1104 includes, for each of the one or more frames of visual data, generating a plurality of padding regions of pixels around the frame of visual data. One or more of the padding regions of pixels include a reflection of a respective region of pixels in the frame of visual data around a border between said padding region of pixels and the respective region of pixels in the frame, e.g., as described in relation to FIG. 10.

The machine-learning convolutional encoder model 1106 may include a plurality of convolutional layers. The plurality of convolutional layers may include one or more two-dimensional spatial convolutions and/or one or more one-dimensional temporal convolutions.

In some examples, the encoder model 1106 is configured to process both video and images. When processing images, the encoder model uses a deflation process to remove the temporal convolutions of the encoder model. In such situations, the input visual data is an image, and processing, using the machine-learning convolutional encoder model, the padded visual data to generate the encoded representation of the input visual data includes, for each of the one or more one-dimensional temporal convolutions of the encoder model: generating a pointwise linear transformation by summing the weights of the one-dimensional temporal convolution and summing the biases of the one-dimensional temporal convolution; and applying the generated pointwise linear transformation to the image.

The method 1102 may further include processing the encoded representation in one or more ways. The encoded representation may be processed using any of the methods disclosed herein for processing encoded/latent representations. Processing, using the machine-learning convolutional decoder model, the encoded representation of the input visual data to generate a reconstruction of the input visual data may include: generating, from the input video, a padded encoded representation; and processing, using the machine-learning convolutional decoder model, the padded encoded representation to generate the reconstruction of the input visual data. The padding may be zero padding. Alternatively, the padding may be reflect padding, for example as described in relation to padding the input visual data in FIG. 10.

As one example, the method may further include processing, using a machine-learning convolutional decoder model, the encoded representation of the input visual data to generate a reconstruction of the input visual data. Any of the decoder models described herein may be used.

FIG. 12 shows an example method 1200 of training an autoencoder model using a latent bottleneck penalty. The method 1200 may be performed by one or more processors operating in one or more locations. The resulting encoder and decoder models are particularly suited to use in diffusion model settings as the resulting latents align with how pixels are represented in diffusion model processes. The autoencoder model (e.g., the encoder model and/or decoder model) may be used as part of a latent diffusion process for generating videos, as described in relation to other aspects of this specification. The autoencoder model has, in some examples, any of the structures described in relation to FIG. 9.

For each of a plurality of training examples 1202 from a training dataset, an encoder model 1204 processes the training example 1202 to generate a latent representation 1208 of the training example 1202. Each training example 1202 is a video or an image taken from a training dataset 1212 of videos and/or images. The latent representations 1208 of the training examples 1202 are processed by a decoder model 1206 to generate respective reconstructions 1210 of the training examples 1202. The reconstructions 1210 of the training examples 1202 are compared to their respective training example 1202 using a loss/objective function 1214. Parameters of the encoder model 1204 and/or decoder model 1206 are updated based on the objective function values for the plurality of training examples 1202.

The loss/objective function 1214 includes: (i) a reconstruction loss 1214A, $L_r$, that penalizes pixel value differences between the reconstruction of the video to the video of the training example (e.g., an L2 loss or the like); and (ii) a latent bottleneck penalty 1214B, $L_{lb}$, that penalizes values of the latent representation of the video that lie outside a predefined range of values.

In some examples, the latent bottleneck penalty 1214B is a sum of respective latent losses for each element/component of the latent representation (e.g., each latent vector, or each element of a latent tensor). Each latent loss has a value of zero when its respective element/component of the latent representation has a value/length within the predefined range of values and a positive non-zero value if its respective element of the latent representation has a value/length outside of the predefined range of values. The predefined range of values may be [−N, N] for some value N. For example, N may be 1, i.e., the predefined range of values is [−1, 1].

For example, the latent bottleneck penalty can have the form:

$$L_{lb} = \lambda \sum_i \max\left((|x_i| - 1, 0)^2\right)$$

where $L_{lb}$ is the latent bottleneck penalty, $\{x_i\}$ are the elements of the latent representation (e.g., latent vectors, elements of a latent tensor) and $\lambda$ is a hyperparameter controlling the relative contribution of the latent bottleneck penalty to the objective function.

The latent bottleneck penalty 1214B can assist in shaping the latent space and minimizing the effect on reconstruction performance. This bottleneck is designed such that our latent variables live within a range of, e.g., [−1, 1], to simulate how pixels are represented in pixel diffusion. While training the autoencoder model, this bottleneck can use a single margin loss scale hyper-parameter that does not need to be tuned. By contrast, other bottlenecks such as vector quantization and KL regularization require tuning of their respective hyper parameters.

In some examples, the objective function 1214 further includes one or more additional losses. For example, the objective function further comprises a perceptual loss 1214C, $L_p$, that penalizes feature differences between the reconstruction of the video to the video of the training example. The perceptual loss 1214C may comprise, for example, a Learned Perceptual Image Patch Similarity, LPIPS, loss. An example of an LPIPs loss is described in "The unreasonable effectiveness of deep features as a perceptual metric" (R. Zhang, et al., IEEE Conference on Computer Vision and Pattern Recognition. pp. 586-595 (2018)), the contents of which are incorporated herein by reference in their entirety.

The objective function 1214 may alternatively or additionally include a discriminator loss 1214D, $L_d$, wherein the discriminator loss 1214D is based on the output of a discriminator model. The discriminator model may be a pre-trained model that is trained to output a prediction of whether an input video is a reconstructed video or a real video. An example of a discriminator model that may be used is the DINO-based discriminator model, for example as described in "Emerging Properties in Self-Supervised Vision Transformers" (M. Caron, et al., arXiv:2104.14294, 2021), the contents of which are incorporated herein by reference in their entirety.

In some examples, updating, based on the objective function values for the plurality of training examples, parameters of the encoder model and/or decoder model includes penalizing gradients of the output of the discriminator model with respect to inputs to the discriminator model.

In some examples, the autoencoder is trained with a combination of losses that aim to optimize 1) overall pixel reconstruction, 2) perceptual quality and 3) enable compression of fine-grained details into a compact representation by optimizing to fool adversarial discriminators. This can be achieved by combining an L2 loss on the pixels, an LPIPs loss and a DINO based discriminator network.

The LPIPs loss optimizes an output and a target video by optimizing to match deep features extracted from a pre-trained VGGNet model rather than raw pixels as in the L2 loss. This penalizes the reconstructions in multiple resolutions and feature hierarchies, resulting in improved FID.

In some examples, the adversarial training setup leverages a pretrained DINO model as a feature extractor, but trains a small discriminator head on the extracted features. Experimentally, it is found that using a DINO based discriminator also improves evaluation metrics over training a discriminator from scratch. It is hypothesized that this happens because the DINO model features already contain rich information that facilitates distinguishing between real and reconstructed data. However, even though a DINO based discriminator improves autoencoder performance, training can be unstable. This is something that adversarial discriminators are notoriously known for. Therefore, the gradients of the discriminator outputs can be penalized with respect to its inputs which is found to improve reconstruction performance further.

Figure 13:
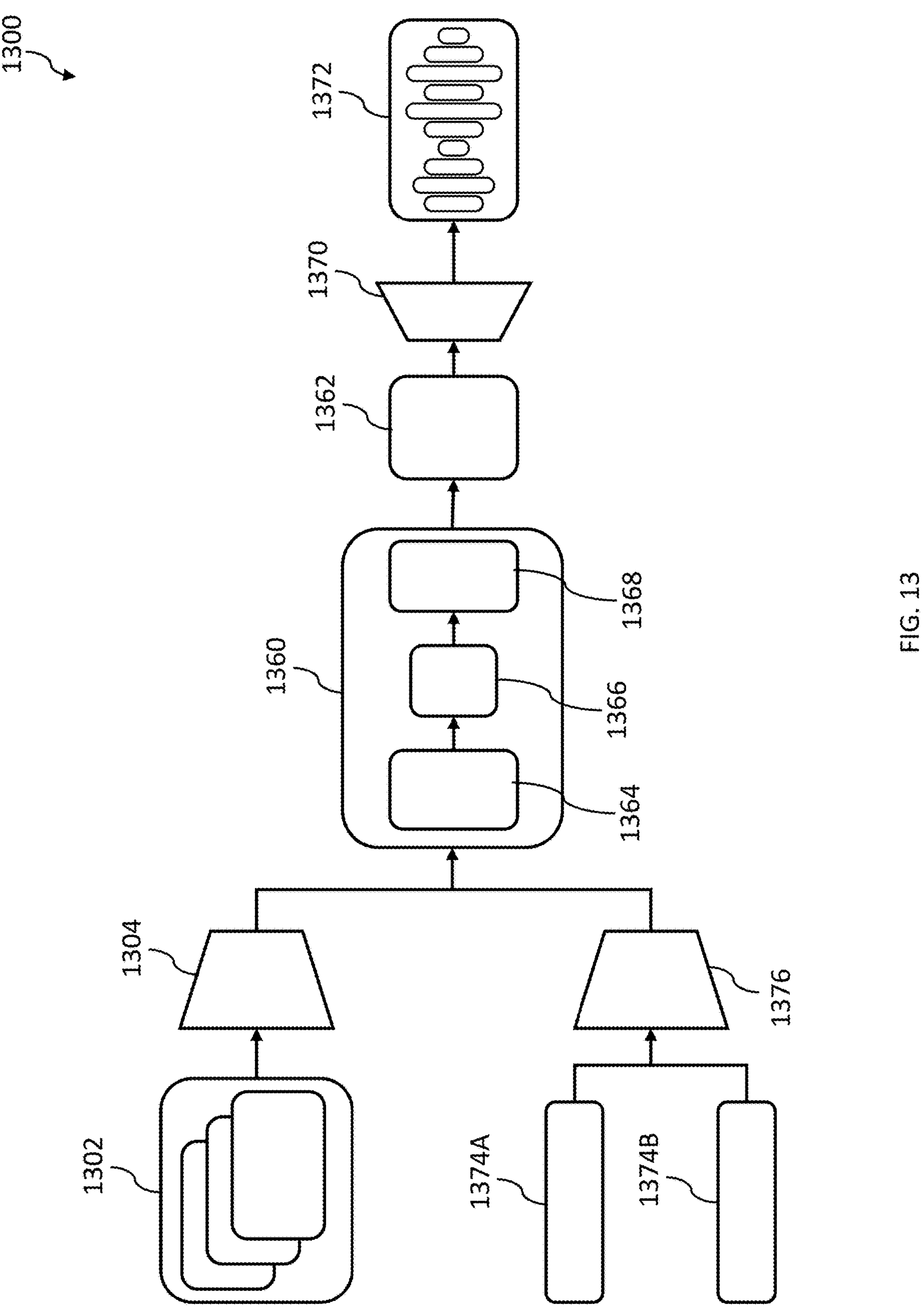
FIG. 13 shows an example method of generating aligned soundtracks for input videos.

FIG. 13 shows an example method 1300 of generating aligned soundtracks for input videos. The method 1300 may be performed by one or more processors operating in one or more locations. The input video 1302 is, in some examples, a video generated using any one or more of the video generation methods described herein. The method utilizes a two-stage diffusion model 1360 to generate a latent representation of the audio 1362. First, a base model 1364 generates a low-resolution log-mel spectrogram 1366. This spectrogram 1366 is then upscaled by a separate diffusion-based upsampling model 1368, before being converted into a waveform 1372 using, e.g., either the Griffin-Lim algorithm or a SoundStream-based vocoder 1370 (e.g., as described in "Soundstream: An end-to-end neural audio codec." N. Zeghidour, et al., *IEEE/ACM Transactions on Audio, Speech, and Language Processing* 30 (2021): 495-507, the contents of which are incorporated herein by reference).

The base model 1364 tackles the challenging task of mapping video and text to audio, while the upsampler 1368 focuses solely on enhancing detail. This latter task is relatively easier: conditioning upsampling on video or text prompts offered no benefit over unconditional upsampling, except for speech, where conditioning on transcription phonemes can yield minor improvements. Both the base and upsampling models may be diffusion UNets with multi-head attention (for both self-attention and cross-attention with conditioning signals) and convolutional blocks). Examples of UNets are described in "High-resolution image synthesis with latent diffusion models" (R. Rombach, et al., In *Proceedings of the IEEE/CVF conference on computer vision and pattern recognition* (pp. 10684-10695)) and "Denoising diffusion probabilistic models" (J. Ho, et al., *Advances in neural information processing systems* 33 (2020): 6840-6851), the content of both of which are incorporated herein by reference.

The method 1300 includes processing, using a machine-learned video encoder model 1304, of an input video 1302 to generate an encoded representation of the input video 1302. The method 1300 further includes generating, using a first audio latent diffusion model 1364 (also referred to as a base audio diffusion model) and based on a set of input data comprising the encoded representation of the input video 1302, a first representation 1366 of accompanying audio for the input video 1302. The first representation 1366 of the accompanying audio is at a first resolution, e.g., is a low-resolution log-mel spectrogram.

The method further includes generating, using a second audio diffusion model 1368 (also referred to as an upsampling model) and conditioned on the first representation 1366 of the accompanying audio, a second representation 1362 of the accompanying audio for the input video. The second representation 1362 of the accompanying audio for the input video is at a second resolution that is a higher resolution than the first resolution, e.g., a higher resolution log-mel spectrograph. The second audio diffusion model 1368 in effect upsamples the first representation 1366 of accompanying audio by a predefined factor, N. The method further comprises processing, using an audio decoder model 1370, the second representation 1362 of the accompanying audio for the input video to generate an output audio waveform 1372 of the accompanying audio for the input video. The audio decoder model 1370 may, for example, be a Griffin-Lim algorithm or a SoundStream-based vocoder.

The audio decoder model 1370 may include a machine-learned audio decoder model.

The first representation 1366 of accompanying audio for the input video may include a log-mel spectrogram at the first resolution, e.g., downsampled N times in time and frequency. N may line in the range [2, 32], e.g., N=8. The second representation 1362 of accompanying audio for the input video includes a log-mel spectrogram at the second resolution. The second resolution may be the full resolution for a log-mel spectrograph.

The first audio latent diffusion model 1364 may include a U-net with a plurality of layers that include one or more residual convolution blocks and one or more attention blocks. For example, the plurality of layers may comprise a downsampling branch and an upsampling branch. Each layer may include a plurality of residual convolution and attention blocks. Cross attention with the conditioning signals may be applied in the first layer. Self-attention may be applied in the subsequent layers. The middle of the UNet may have a self-attention layer sandwiched between two residual blocks.

For example, the base diffusion model 1364 generates the downsampled (both in time and frequency) log-mel spectrograms obtained from 24 kHz stereo audio (with two spectrogram "channels" corresponding to the two audio channels).

The second audio latent diffusion model 1368 upsamples the low-resolution spectrogram both in time and frequency resulting in full-resolution log-mel spectrogram. The second audio latent diffusion model 1368 may include a U-net with a plurality of layers that include one or more residual convolution blocks and one or more attention blocks. The plurality of layers may include a downsampling branch and an upsampling branch. One or more (e.g., a plurality of) layers may include a plurality of residual convolution and attention blocks.

For example, the second audio latent diffusion model 1368 has an architecture that is also a UNet similar to the base network. Similar to video conditioning in the base model, the low-res spectrogram can be upsampled bilinearly and summed with the (noisy) upsampled spectrogram after projection in the first layer. It is also conditioned on the transcript phonemes. The second audio latent diffusion model 1368 may also be conditioned on the transcript phonemes through cross-attention in another layer.

To ensure precise audio-visual synchronization, the video embeddings can be aligned with the corresponding (noisy) spectrogram features along the time axis before combining them. The video may be centre-cropped to 256×256 pixels at a frame rate of 24 fps.

In some examples, processing, using the machine-learned video encoder model 1304, the input video 1302 to generate the encoded representation of the input video includes: extracting a plurality of features from each frame of the input video 1302 using an image-text contrastive model; and embedding the plurality of features of the frames of the input video using a convolutional video encoder model. For example, for each frame, spatial features are extracted using a pre-trained ALIGN image-text contrastive NFNet model. This provides features at multiple scales. Examples of such models are described in "High-performance large-scale image recognition without normalization" (A. Brock, et al., In International conference on machine learning, pp. 1059-1071. PMLR, 2021) and "Scaling up visual and vision-language representation learning with noisy text supervision" (C. Jiao, et al., In International conference on machine learning, pp. 4904-4916, PMLR, 2021) the contents of both of which are incorporated herein by reference.

For the video embedding, a 3D convolutional network (learnt jointly with the base diffusion model) can be used to embed the frame-level features, downsampling in time to match the temporal resolution of the low-resolution spectrogram, while the spatial dimensions are flattened and aligned with the spectrogram's frequency axis. The video embeddings are, in some examples, summed with the projected "noisy" spectrogram features in the first layer of the UNet, ensuring direct correspondence between visual information and audio features.

The two-stage diffusion model 1360 can be conditioned on one or more further sets of conditioning data 1372A, 1372B. The further sets of conditioning data 1374A, 1374B can be processed by corresponding encoder models 1376.

For examples, the two-stage diffusion model 1360 can optionally be conditioned on one or more of: (i) a video text prompt, e.g., the same text prompt used for video generation; (ii) an audio text prompt, e.g., a description of the desired audio events, e.g., "walking, chirping"; and/or (iii) dialogue transcripts, e.g., a transcript of any dialogue. These extra inputs are made optional during training by randomly zeroing them out.

For example, the method 1300 may further include: processing, using a machine-learned text encoder model, an input video prompt to generate an encoded representation of the input video prompt, wherein the input video prompt comprises a prompt used to generate the input video. The set of input data may further comprise the encoded representation of the input video prompt.

Alternatively or additionally, the method 1300 may further include: processing, using a machine-learned text encoder model, an input audio prompt to generate an encoded representation of the input audio prompt, wherein the input audio prompt comprises a natural language description of audio events in the input video. The set of input data may further comprise the encoded representation of the input audio prompt. The audio prompt may describe audio events which may be absent in the video prompt (e.g., background sound effects).

Alternatively or additionally, the method 1300 may further include: processing, using a machine-learned text encoder model, an input transcript to generate an encoded representation of the input transcript, wherein the input transcript comprises a plurality of phonemes corresponding to any speech in the input video. The set of input data may further comprise the encoded representation of the input transcript. The second audio diffusion model 1368 may be further conditioned on the encoded representation of the input transcript. The second audio diffusion model 1368 may be further conditioned on the plurality of phonemes of the input transcript through cross attention. In other words, phonemes for transcripts corresponding to any speech (obtained using automatic speech recognition) can be input into the model.

Text-based prompts can be embedded using a pre-trained UL2 text encoder while the transcripts phonemes are embedded using a transformer, which is trained online. The prompt and transcript embeddings are concatenated and further encoded using a transformer. This conditioning signal is incorporated into the model through cross-attention in the first layer. Encoding the audio text prompt during training with a pre-trained text encoder (UL2) enables conditioning with a free-form audio text prompt at inference. Examples of UL2 models are described in "U12: Unifying language learning paradigms" (Y. Tay, et al., *arXiv preprint arXiv:* 2205.05131, 2022) the contents of which are incorporated herein by reference.

FIG. 14 shows a flow diagram of an example method 1400 for generating video using a diffusion model. The method 1400 may be performed by one or more computers operating in one or more locations, e.g., the system/apparatus of FIG. 20. For convenience, the method 1400 is described as being performed by a system.

At operation 1402, the system receives an input set of tokens comprising a plurality of video tokens. The input set of tokens comprises a plurality of input video tokens, wherein each input video token comprises a latent representation of a respective one or more pixels of an input video and an input positional embedding representing a spatial and temporal position of the one or more pixels of the input video.

In some examples, the plurality of input video tokens further comprises a plurality of text tokens representing a description of a target video. The system may generate, using a text encoder, the plurality of text tokens from natural language input comprising a description of one or more properties of a target video.

In some examples, the input positional embedding is a relative positional embedding.

In some examples, the input video comprises a noise video. In some examples, the input set of tokens further comprises a quality score token indicative of a target quality for the video. In some examples, the input set of tokens further comprises a plurality of input image tokens representing an input conditioning image. The system may generate, using an image encoder, the plurality of input image tokens from the input conditioning image.

At operation 1404, the system processes the input set of tokens using a latent diffusion model to generate an output set of tokens. The output set of tokens comprises a plurality of output video tokens, wherein each output video token comprises a latent representation of a respective one or more pixels of an output video.

In some examples, each output video token further comprises an output positional embedding representing a spatial and temporal position of the one or more pixels of the output video. In some examples, the output positional embedding is a relative positional embedding.

The latent diffusion model may comprise a plurality of transformer layers. One or more of the transformer layers may be global transformer layers that attend to all tokens in a respective input sequence of tokens. One or more of the transformer layers are local transformer layers that attend to a sliding window of tokens in a respective input sequence of tokens.

In some examples, processing the input set of tokens using the latent diffusion model to generate an output set of tokens comprises: generating, using a first latent diffusion model and based on input set of tokens, a first latent representation of the output video in a first latent space, wherein the first latent representation of the video is at a first resolution; and generating, using a second latent diffusion model and conditioned on the first latent representation, a second latent representation of the output video in a second latent space, wherein the second latent representation of the video is at a second resolution that is a higher resolution than the first resolution.

At operation 1406, the system processes the output set of tokens using a machine-learning decoder model to generate an output video from the plurality of output video tokens.

FIG. 15 shows a flow diagram of an example method 1500 for generating video using a diffusion model. The method 1500 may be performed by one or more computers operating in one or more locations, e.g., the system/apparatus of FIG. 20. For convenience, the method 1500 is described as being performed by a system.

At operation 1502, the system generates, using a first latent diffusion model, a first latent representation of a video in a first latent space. The first latent representation of the video is at a first resolution.

The first latent representation may comprise a plurality of first latent chunks of the video in the first latent space. Each first latent chunk in the first latent space may correspond to a respective chunk of video that overlaps with one or more other chunks of video.

At operation 1504, the system generates, using a second latent diffusion model and conditioned on the first latent representation, a second latent representation of the video in a second latent space. The second latent representation of the video is at a second resolution that is a higher resolution than the first resolution.

Figure 16:
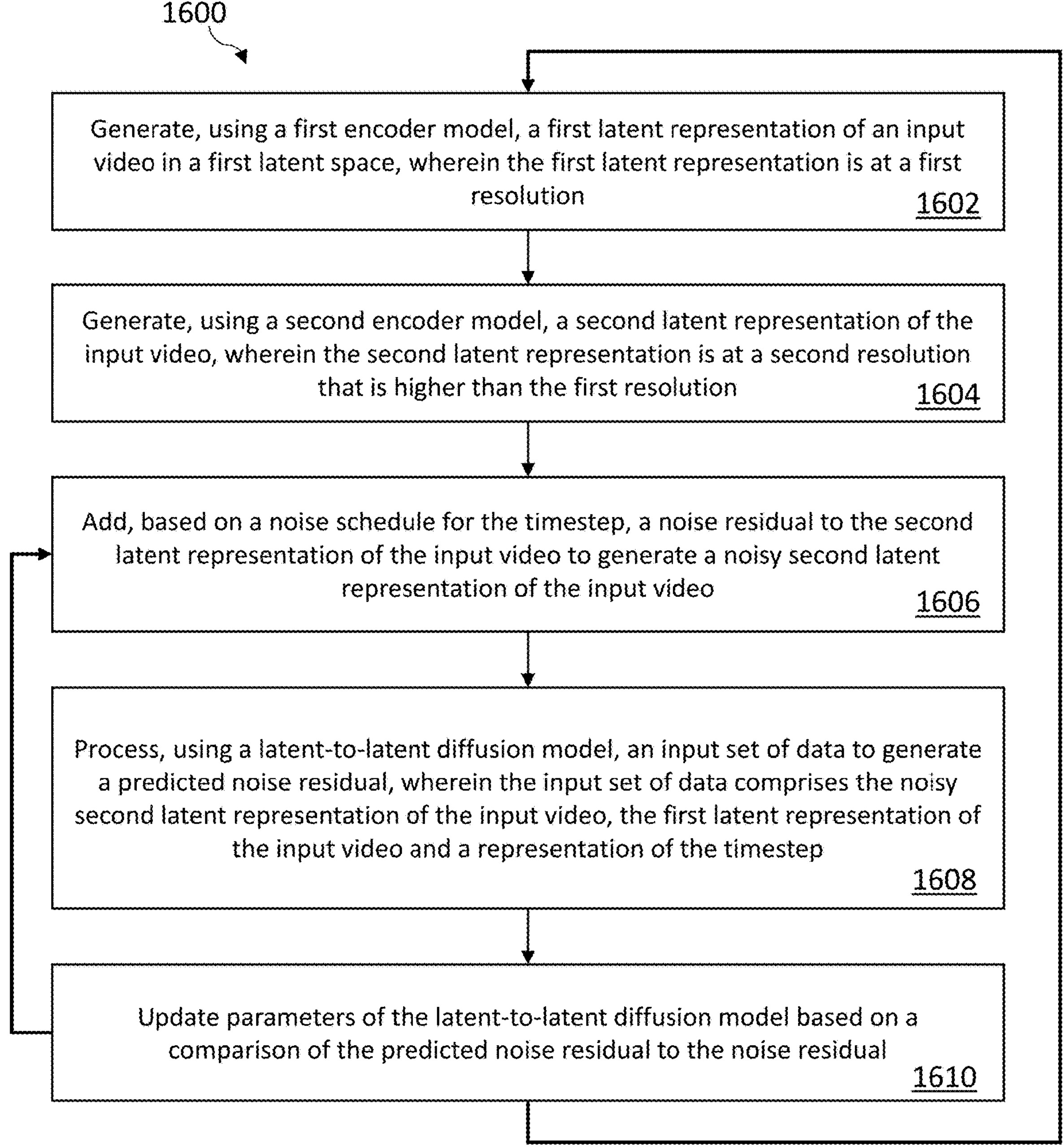
FIG. 16 shows a flow diagram of an example method for method for training a latent-to-latent diffusion model.

The second diffusion model may have been trained using the method of FIG. 16.

Generating, using the second latent diffusion model and conditioned on the first latent representation, the second latent representation of the video may comprise, at each of a plurality of timesteps: processing, using the second latent diffusion model, a set of input data for the timestep to generate a denoising output for the timestep, wherein the set of input data for the timestep comprises the first latent representation, a set of output data of previous timestep and a timestep embedding corresponding to the timestep.

Processing, using the second latent diffusion model, a set of input data for the timestep to generate the denoising output for the timestep may comprise: processing, using a downsampling branch, the set of input data for the timestep to generate a downsampled representation of the input data for the timestep; processing, using an intermediate block, the downsampled representation of the input data for the timestep to generate a set of transformed data for the timestep; processing, using an upsampling branch, the set of transformed data for the timestep to generate a set of denoising data for the timestep; and generating a set of output data for the timestep based on the input data for the timestep and the denoising data. The second latent diffusion model may comprise one or more skip connections between the downsampling branch and the upsampling branch.

The downsampling branch may comprise one or more convolutional layers and/or one or more transformer layers. The upsampling branch comprises one or more convolutional layers and/or one or more transformer layers. The one or more convolutional layers of the downsampling branch may each be connected to a respective convolutional layer in the upsampling branch via a skip connection. The one or more transformer layers of the downsampling branch may each be connected to a respective transformer layer in the upsampling branch via a skip connection.

In examples where the first latent representation comprises a plurality of first latent chunks of the video in the first latent space, generating, using the second latent diffusion model and conditioned on the first latent representation, the second latent representation of the video in the second latent space may comprise: processing, using the second latent diffusion model, each first latent chunk to generate a respective second latent chunk in the second latent space, wherein each second latent chunk in the second latent space corresponds to a respective chunk of video that overlaps with one or more other chunks of video; and merging the second latent chunks to generate the second latent representation in the second latent space.

Processing, using the second latent diffusion model, a first latent chunk to generate the respective second latent chunk in the second latent space may be conditioned on one or more frames of a previously generated overlapping second latent chunk. Merging the second latent chunks to generate the second latent representation in the second latent space may comprise performing interpolation on overlapping frames of the second latent chunks.

At operation 1506, the system processes, using a machine-learning decoder model, the second latent representation of the video to generate an output video in pixel space.

Processing, using the machine-learning decoder model, the second latent representation of the video to generate the output video in pixel space may comprise: splitting the second latent representation into a plurality of spatio-temporal chunks of latents, each spatio-temporal chunks overlapping with one or more other spatiotemporal chunks; processing, using the machine-learning decoder model, each spatiotemporal chunk of latent to generate a respective chunk of output video data; and merging the chunks of output video data to generate the output video in pixel space. Merging the chunks of output video data to generate the output video in pixel space may comprise performing interpolation on overlapping frames of the chunks of output video data.

FIG. 16 shows a flow diagram of an example method 1600 for method for training a latent-to-latent diffusion model. The method 1600 may be performed by one or more computers operating in one or more locations, e.g., the system/apparatus of FIG. 20. For convenience, the method 1600 is described as being performed by a system.

At operation 1602, the system generates, using a first encoder model, a first latent representation of an input video in a first latent space. The first latent representation is at a first resolution. The input video is taken from a training dataset comprising a plurality of training videos.

In some examples, generating, using the first encoder model, the first latent representation of the input video in the first latent space comprises: processing the input video using the first encoder model to generate an initial first latent representation of the input video in the first latent space; generating, based on a noise augmentation schedule, a set of noise for an augmentation timestep; and generating the first latent representation of the input video in the first latent space by combining the set of noise for the timestep with the initial first latent representation of the input video.

Generating the first latent representation of the input video in the first latent space by combining the set of noise for the augmentation timestep with the initial first latent representation of the input video may comprise performing, with a predefined probability, a weighted sum of the set of noise for the augmentation timestep and the initial first latent representation of the input video, wherein weights of the weighted sum depend on the augmentation timestep.

The weighted sum is, in some examples, given by: $x=\cos(\pi t/2)\ x0+\sin \pi t/2$, where x is the first latent representation of the input video, x0 is the initial first latent representation of the input video, is the set of noise for the augmentation timestep, and t is the time for the augmentation timestep.

At operation 1604, the system generates, using a second encoder model, a second latent representation of the input video. The second latent representation is at a second resolution that is higher than the first resolution.

Operations 1606 to 1610 are repeated for a plurality of timesteps.

At operation 1606, the system adds, based on a noise schedule for the timestep, a noise residual to the second latent representation of the input video to generate a noisy second latent representation of the input video.

At operation 1608, the system processes, using a latent-to-latent diffusion model, an input set of data to generate a predicted noise residual. The input set of data comprises the noisy second latent representation of the input video, the first latent representation of the input video and a representation of the timestep.

The input set of data for a timestep may further comprise the set of noise for an augmentation timestep. The input set of data for a timestep further comprises an initial one or more frames of the second latent representation of the input video.

Processing, using the latent-to-latent diffusion model, the input set of data to generate the predicted noise residual may comprise: processing, using a downsampling branch, the set of input data for the timestep to generate a downsampled representation of the input data for the timestep; processing, using an intermediate block, the downsampled representation of the input data for the timestep to generate a set of transformed data for the timestep; and processing, using an upsampling branch, the set of transformed data for the timestep to generate the predicted noise residual. The latent-to-latent diffusion model may comprise one or more skip connections between the downsampling branch and the upsampling branch.

At operation 1610, the system updates parameters of the latent-to-latent diffusion model based on a comparison of the predicted noise residual to the noise residual. The updates may, in some examples, be performed after a batch of training examples have been processed.

The system may iterate operations 1602 to 1610 over a plurality of training examples.

FIG. 17 shows a flow diagram of an example method 1700 for encoding visual data. The method 1700 may be performed by one or more computers operating in one or more locations, e.g., the system/apparatus of FIG. 20. For convenience, the method 1700 is described as being performed by a system.

At operation 1702, the system receives input visual data comprising one or more frames of visual data. The input visual data is a video may comprise a plurality of frames of video data. The input visual data may be an image.

At operation 1704, the system generates, from the input visual data, a set of padded visual data.

Generating the set of set of padded visual data comprises, at operation 1606, for each of the one or more of frames of visual data: generating a plurality of padding regions of pixels around the frame of visual data. One or more of the padding regions of pixels comprises a reflection of a respective region of pixels in the frame of visual data around a border between said padding region of pixels and the respective region of pixels in the frame.

The plurality of padding regions of pixels around a frame of visual data may, for example, comprise: an upper padding region comprising a first strip of pixels comprising a reflection of a corresponding strip of pixels along the top of the frame, wherein the reflection is around the top edge of the frame; a lower padding region comprising a second strip of pixels comprising a reflection of a corresponding strip of pixels along the bottom of the frame, wherein the reflection is around the bottom edge of the frame; a left padding region comprising a third strip of pixels comprising a reflection of a corresponding strip of pixels along the left of the frame, wherein the reflection is around the left edge of the frame; and a right padding region comprising a fourth strip of pixels comprising a reflection of a corresponding strip of pixels along the right of the frame, wherein the reflection is around the right edge of the frame.

The plurality of padding regions of pixels around the frame of visual data may further comprise, in some examples, four corner padding regions, each corner padding region comprising a respective reflection of at least a part of: the upper padding region, the lower padding regions, the left padding region and/or the right padding region.

At operation 1708, the system processes, using a machine-learning convolutional encoder model, the padded visual data to generate an encoded representation of the input visual data.

The machine-learning convolutional encoder model may comprise a plurality of convolutional layers, the plurality of convolutional layers comprising one or more two-dimensional spatial convolutions and one or more one-dimensional temporal convolutions.

In examples where the input visual data is an image, processing, using the machine-learning convolutional encoder model, the padded visual data to generate the encoded representation of the input visual data may comprise, for each of the one or more one-dimensional temporal convolutions: generating a pointwise linear transformation by summing the weights of the one-dimensional temporal convolution and summing the biases of the one-dimensional temporal convolution; and applying the generated pointwise linear transformation to the image.

In some examples the method further comprises processing, using a machine-learning convolutional decoder model, the encoded representation of the input visual data to generate a reconstruction of the input visual data. This processing may be performed by the system or a further system, e.g., a further system to which the encoded representation has been transmitted over a network. Processing, using the machine-learning convolutional decoder model, the encoded representation of the input visual data to generate a reconstruction of the input visual data may comprise: generating, from the input video, a padded encoded representation; and processing, using the machine-learning convolutional decoder model, the padded encoded representation to generate the reconstruction of the input visual data. The padding may be zero padding. The padding may be reflect padding.

Figure 18:
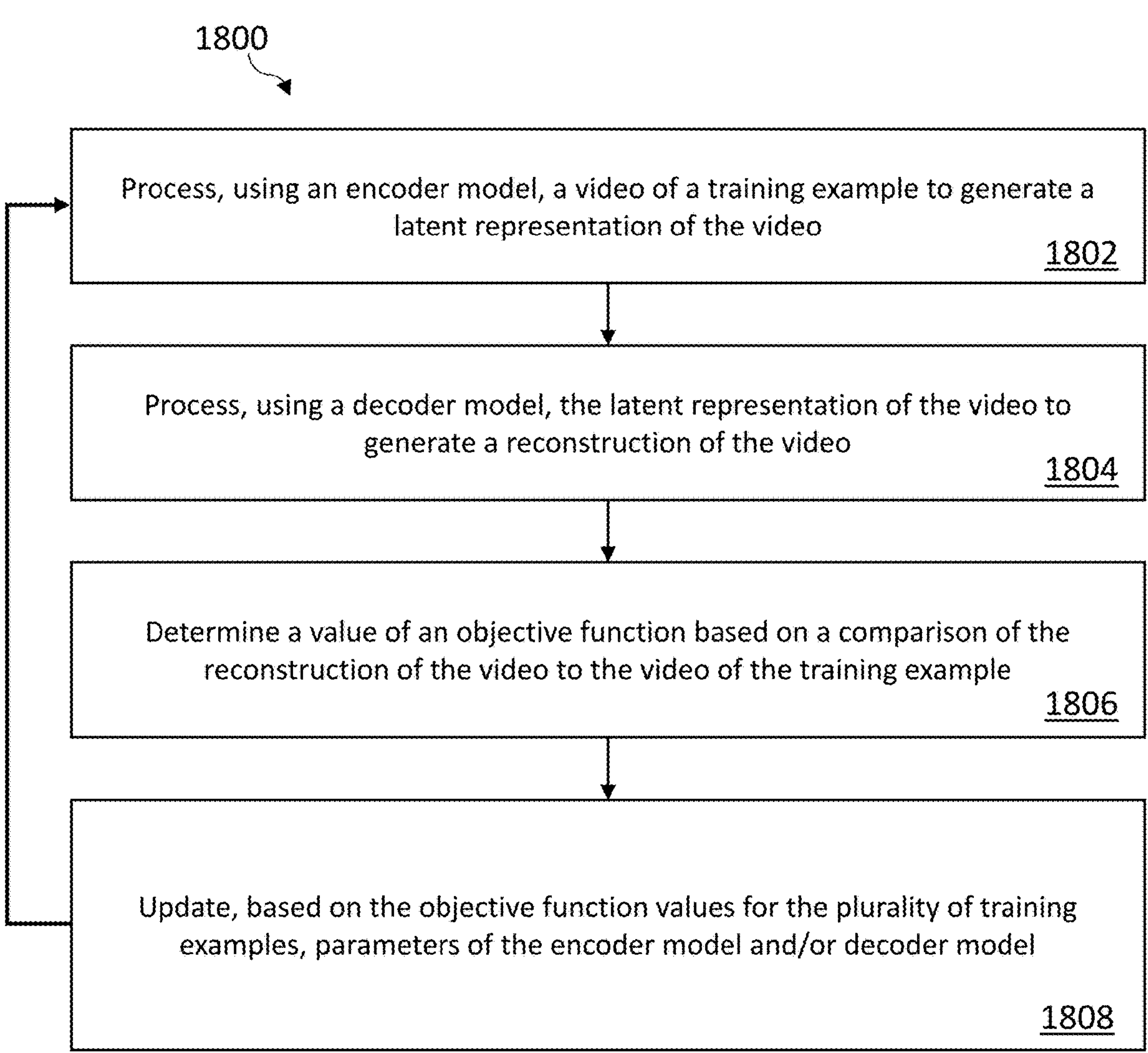
FIG. 18 shows a flow diagram of an example method for training an autoencoder model.

FIG. 18 shows a flow diagram of an example method 1800 for training an autoencoder model. The method 1800 may be performed by one or more computers operating in one or more locations, e.g., the system/apparatus of FIG. 20. For convenience, the method 1800 is described as being performed by a system. The encoder and/or decoder models training using the method 1800 may be used in any of the methods described herein.

Operations 1802 to 1806 are iterated over a batch (e.g., a plurality) of training examples in a training dataset. Each training example comprises a respective video.

At operation 1802, the system processes, using an encoder model, the video of the training example to generate a latent representation of the video.

At operation 1804, the system processes, using a decoder model, the latent representation of the video to generate a reconstruction of the video.

At operation 1806, the system determines an objective function value based on a comparison of the reconstruction of the video to the video of the training example. The objective function comprises a reconstruction loss that penalises pixel value differences between the reconstruction of the video to the video of the training example. The objective function further comprises a latent bottleneck penalty that penalises values of the latent representation of the video that lie outside a predefined range of values. The predefined range of values may be [−1, 1]

The latent bottleneck penalty may be a sum of respective latent losses for each element of the latent representation. Each latent loss may have a value of zero when its respective element of the latent representation is within the predefined range of values and a positive non-zero value its respective element of the latent representation is outside of the predefined range of values. The latent bottleneck penalty may have the form: $L_{lb}=\lambda\Sigma_i \max((|x_i|-a, 0)^2)$, where $L_{lb}$ is the latent bottleneck penalty, $\{x_i\}$ are the components of the latent representation and $\lambda$ is a hyperparameter controlling the relative contribution of the latent bottleneck penalty to the objective function.

The objective function may further comprise a perceptual loss that penalises feature differences between the reconstruction of the video to the video of the training example. The perceptual loss comprises a Learned Perceptual Image Patch Similarity, LPIPS, loss. The objective function may further comprise a discriminator loss, wherein the discriminator loss is based on the output of a discriminator model. Updating, based on the objective function values for the plurality of training examples, parameters of the encoder model and/or decoder model may comprise penalising gradients of the output of the discriminator model with respect to inputs to the discriminator model.

At operation 1808, the system updates, based on the objective function values for the plurality of training examples in the batch, parameters of the encoder model and/or decoder model.

Operations 1802 to 1802 may be iterated over a plurality of training batches.

FIG. 19 shows a flow diagram of an example method 1900 for generating audio for an input video. The method 1800 may be performed by one or more computers operating in one or more locations, e.g., the system/apparatus of FIG. 20. For convenience, the method 1800 is described as being performed by a system.

At operation 1902, the system processes, using a machine-learned video encoder model, of an input video to generate an encoded representation of the input video. The video may have been generated using any of the video generation methods described herein.

Processing, using the machine-learned video encoder model, of the input video to generate the encoded representation of the input video may comprise: extracting a plurality of features from each frame of the input video using an image-text contrastive model; and embedding the plurality of features of the frames of the input video using a convolutional video encoder model.

The method may further comprise: processing, using a machine-learned text encoder model, an input video prompt to generate an encoded representation of the input video prompt, wherein the input video prompt comprises a prompt used to generate the input video. The method may further comprise: processing, using a machine-learned text encoder model, an input audio prompt to generate an encoded representation of the input audio prompt, wherein the input audio prompt comprises a natural language description of audio events in the input video. The method may further comprise: processing, using a machine-learned text encoder model, an input transcript to generate an encoded representation of the input transcript, wherein the input transcript comprises a plurality of phonemes corresponding to any speech in the input video.

At operation 1904, the system generates, using a first audio latent diffusion model and based on a set of input data comprising the encoded representation of the input video, a first representation of accompanying audio for the input video. The first representation of the accompanying audio is at a first resolution. The first representation may be a log-mel spectrogram at the first resolution. The set of input data further may further comprise the encoded representation of the input video prompt, if present. The set of input data may further comprise the encoded representation of the input audio prompt, if present. The set of input data may further comprise the encoded representation of the input transcript, if present.

The first audio latent diffusion model may comprise a U-net with a plurality of layers comprising one or more residual convolution blocks and one or more attention blocks.

At operation 1906, the system generates, using a second audio diffusion model and conditioned on the first representation of the accompanying audio, a second representation of the accompanying audio for the input video. The second representation of the accompanying audio for the input video is at a second resolution that is a higher resolution than the first resolution. The second representation of accompanying audio for the input video may be a log-mel spectrogram at the second resolution.

The second audio latent diffusion model comprises a U-net with a plurality of layers comprising one or more residual convolution blocks and one or more attention blocks.

The second audio diffusion model may be further conditioned on the encoded representation of the input transcript. The second audio diffusion model may be further conditioned on the plurality of phonemes of the input transcript through cross attention.

At operation 1908, the system processes, using an audio decoder model, the second representation of the accompanying audio for the input video to generate an output audio waveform of the accompanying audio for the input video.

The audio decoder model may comprise a machine-learned audio decoder model.

Figure 20:
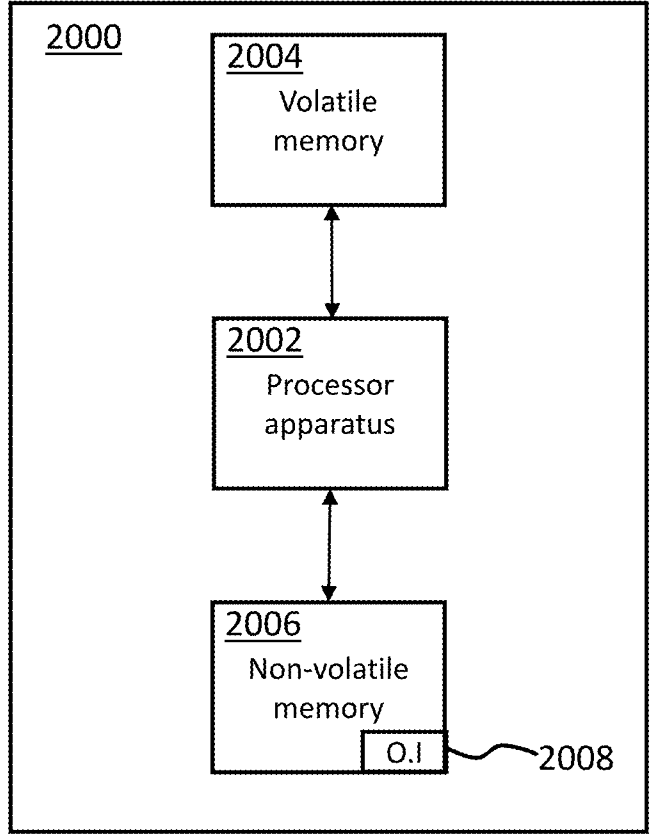
FIG. 20 shows a schematic overview of an example system/apparatus.

FIG. 20 shows a schematic overview of an example system/apparatus 2000 for performing any one or more of the methods described herein. The system/apparatus shown is an example of a computing device. It will be appreciated by the skilled person that other types of computing devices/systems may alternatively be used to implement the methods described herein, such as a distributed computing system.

The apparatus (or system) 2000 comprises one or more processors 2002. The one or more processors control operation of other components of the system/apparatus 2000. The one or more processors 2002 may, for example, comprise a general purpose processor. The one or more processors 2002 may be a single core device or a multiple core device. The one or more processors 2002 may comprise a Central Processing Unit (CPU) or a graphical processing unit (GPU). Alternatively, the one or more processors 2002 may comprise specialized processing hardware, for instance a RISC processor or programmable hardware with embedded firmware. Multiple processors may be included.

The system/apparatus comprises a working or volatile memory 2004. The one or more processors may access the volatile memory 2004 in order to process data and may control the storage of data in memory. The volatile memory 2004 may comprise RAM of any type, for example Static RAM (SRAM), Dynamic RAM (DRAM), or it may comprise Flash memory, such as an SD-Card.

The system/apparatus comprises a non-volatile memory 2006. The non-volatile memory 2006 stores a set of operation instructions 2008 for controlling the operation of the processors 2002 in the form of computer readable instructions. The non-volatile memory 2006 may be a memory of any kind such as a Read Only Memory (ROM), a Flash memory or a magnetic drive memory.

The one or more processors 2002 are configured to execute operating instructions 2008 to cause the system/apparatus to perform any of the methods described herein. The operating instructions 2008 may comprise code (i.e., drivers) relating to the hardware components of the system/apparatus 2000, as well as code relating to the basic operation of the system/apparatus 2000. Generally speaking, the one or more processors 2002 execute one or more instructions of the operating instructions 2008, which are stored permanently or semi-permanently in the non-volatile memory 2006, using the volatile memory 2004 to store temporarily data generated during execution of said operating instructions 2008.

In this specification, the term "configured" is used in relation to computing systems and environments, as well as computer program components. A computing system or environment is considered "configured" to perform specific operations or actions when it possesses the necessary software, firmware, hardware, or a combination thereof, enabling it to carry out those operations or actions during operation. For instance, configuring a system might involve installing a software library with specific algorithms, updating firmware with new instructions for handling data, or adding a hardware component for enhanced processing capabilities. Similarly, one or more computer programs are "configured" to perform particular operations or actions when they contain instructions that, upon execution by a computing device or hardware, cause the device to perform those intended operations or actions.

The embodiments and functional operations described in this specification can be implemented in various forms, including digital electronic circuitry, software, firmware, computer hardware (encompassing the disclosed structures and their structural equivalents), or any combination thereof. The subject matter can be realized as one or more computer programs, essentially modules of computer program instructions encoded on a tangible non-transitory storage medium for execution by or to control the operation of a computing device or hardware. The storage medium can be a storage device such as a hard drive or solid-state drive (SSD), a storage medium, a random or serial access memory device, or a combination of these. Additionally or alternatively, the program instructions can be encoded on a transmitted signal, such as a machine-generated electrical, optical, or electromagnetic signal, designed to carry information for transmission to a receiving device or system for execution by a computing device or hardware. Furthermore, implementations may leverage emerging technologies like quantum computing or neuromorphic computing for specific applications, and may be deployed in distributed or cloud-based environments where components reside on different machines or within a cloud infrastructure.

The term "computing device or hardware" refers to the physical components involved in data processing and encompasses all types of devices and machines used for this purpose. Examples include processors or processing units, graphics processing units (GPUs), tensor processing units (TPUs), and specialized processing hardware such as field-programmable gate arrays (FPGAs) or application-specific integrated circuits (ASICs). In addition to hardware, a computing device or hardware may also include code that creates an execution environment for computer programs. This code can take the form of processor firmware, a protocol stack, a database management system, an operating system, or a combination of these elements. Embodiments may particularly benefit from utilizing the parallel processing capabilities of GPUs, in a General-Purpose computing on Graphics Processing Units (GPGPU) context, where code specifically designed for GPU execution, often called kernels or shaders, is employed. Similarly, TPUs excel at running optimized tensor operations crucial for many machine learning algorithms. By leveraging these accelerators and their specialized programming models, the system can achieve significant speedups and efficiency gains for tasks involving artificial intelligence and machine learning, particularly in areas such as computer vision, natural language processing, and robotics.

A computer program, also referred to as software, an application, a module, a script, code, or simply a program, can be written in any programming language, including compiled or interpreted languages, and declarative or procedural languages. It can be deployed in various forms, such as a standalone program, a module, a component, a subroutine, or any other unit suitable for use within a computing environment. A program may or may not correspond to a single file in a file system and can be stored in various ways. This includes being embedded within a file containing other programs or data (e.g., scripts within a markup language document), residing in a dedicated file, or distributed across multiple coordinated files (e.g., files storing modules, subprograms, or code segments). A computer program can be executed on a single computer or across multiple computers, whether located at a single site or distributed across multiple sites and interconnected through a data communication network. The specific implementation of the computer programs may involve a combination of traditional programming languages and specialized languages or libraries designed for GPGPU programming or TPU utilization, depending on the chosen hardware platform and desired performance characteristics.

In this specification, the term "engine" broadly refers to a software-based system, subsystem, or process designed to perform one or more specific functions. An engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be executed by one or more programmable computers running one or more computer programs to perform functions by operating on input data and generating output. Graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. These processes and logic flows can be implemented using specialized processing hardware, such as field-programmable gate arrays (FPGAs) or application-specific integrated circuits (ASICs), for even greater performance or energy efficiency in specific use cases.

Computers capable of executing a computer program can be based on general-purpose microprocessors, special-purpose microprocessors, or a combination of both. They can utilize any type of central processing unit (CPU) graphics processing units (GPUs), tensor processing units (TPUs), and other machine learning accelerators. GPUs, TPUs, and other machine learning accelerators may be employed to enhance performance, particularly for tasks involving artificial intelligence and machine learning. These accelerators may work in conjunction with CPUs, handling specialized computations while the CPU manages overall system operations and other tasks. The specific configuration of processing units and memory will depend on factors like the complexity of the AI model, the volume of data being processed, and the desired performance and latency requirements. Embodiments can be implemented on a wide range of computing platforms, from small embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. The user can provide input through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using machine learning frameworks, such as TensorFlow or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

The computing system can include clients and servers that may be geographically separated and interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising:

generating, using a first latent diffusion model, a first latent representation of a video in a first latent space, wherein the first latent representation of the video is at a first resolution, and wherein generating the first latent representation comprises performing a first reverse diffusion process that comprises a plurality of first timesteps using the first latent diffusion model;

after performing the first reverse diffusion process using the first latent diffusion model to generate the first latent representation, generating, using a second, different latent diffusion model and conditioned on the first latent representation, a second latent representation of the video in a second latent space, wherein the second latent representation of the video is at a second resolution that is a higher resolution than the first resolution, and wherein generating the second latent representation comprises performing a second reverse diffusion process that comprises a plurality of second timesteps using the second latent diffusion model conditioned on the first latent representation generated by performing the first reverse diffusion process using the first latent diffusion model; and processing, using a machine-learning decoder model, the second latent representation of the video to generate an output video in pixel space.

2. The method of claim 1, wherein performing the second reverse diffusion process comprises, at each of a plurality of the second timesteps:

processing, using the second latent diffusion model, a set of input data for the timestep to generate a denoising output for the second timestep, wherein the set of input data for the second timestep comprises the first latent representation, a set of output data of a previous second timestep and a timestep embedding corresponding to the second timestep.

3. The method of claim 2, wherein processing, using the second latent diffusion model, a set of input data for the timestep to generate the denoising output for the second timestep comprises:

processing, using a downsampling branch, the set of input data for the second timestep to generate a downsampled representation of the input data for the second timestep;

processing, using an intermediate block, the downsampled representation of the input data for the second timestep to generate a set of transformed data for the second timestep;

processing, using an upsampling branch, the set of transformed data for the timestep to generate a set of denoising data for the second timestep; and generating a set of output data for the second timestep based on the input data for the second timestep and the denoising data, wherein the second latent diffusion model comprises one or more skip connections between the downsampling branch and the upsampling branch.

4. The method of claim 3, wherein:

the downsampling branch comprises one or more convolutional layers and one or more transformer layers; and the upsampling branch comprises one or more convolutional layers and a one or more transformer layers, wherein the one or more convolutional layers of the downsampling branch are each connected to a respective convolutional layer in the upsampling branch via a skip connection, and wherein the one or more transformer layers of the downsampling branch are each connected to a respective transformer layer in the upsampling branch via a skip connection.

5. The method of claim 1, wherein:

the first latent representation comprises a plurality of first latent chunks of the video in the first latent space, wherein each first latent chunk in the first latent space corresponds to a respective chunk of video that overlaps with one or more other chunks of video; and generating, using the second latent diffusion model and conditioned on the first latent representation, the second latent representation of the video in the second latent space comprises:

processing, using the second latent diffusion model, each first latent chunk to generate a respective second latent chunk in the second latent space, wherein each second latent chunk in the second latent space corresponds to a respective chunk of video that overlaps with one or more other chunks of video; and merging the second latent chunks to generate the second latent representation in the second latent space.

6. The method of claim 5, wherein processing, using the second latent diffusion model, a first latent chunk to generate the respective second latent chunk in the second latent space is conditioned on one or more frames of a previously generated overlapping second latent chunk.

7. The method of claim 5, merging the second latent chunks to generate the second latent representation in the second latent space comprises performing interpolation on overlapping frames of the second latent chunks.

8. The method of claim 5, wherein processing, using the machine-learning decoder model, the second latent representation of the video to generate the output video in pixel space comprises:

splitting the second latent representation into a plurality of spatio-temporal chunks of latents, each spatio-temporal chunks overlapping with one or more other spatiotemporal chunks;

processing, using the machine-learning decoder model, each spatiotemporal chunk of latent to generate a respective chunk of output video data; and merging the chunks of output video data to generate the output video in pixel space.

9. The method of claim 8, wherein merging the chunks of output video data to generate the output video in pixel space comprises performing interpolation on overlapping frames of the chunks of output video data.

10. A system comprising one or more computers and one or more memories, the one or more memories storing computer readable instructions that, when executed by the one or more processors, cause the one or more computers to perform operations comprising:

generating, using a first latent diffusion model, a first latent representation of a video in a first latent space, wherein the first latent representation of the video is at a first resolution, and wherein generating the first latent representation comprises performing a first reverse diffusion process that comprises a plurality of first timesteps using the first latent diffusion model;

after performing the first reverse diffusion process using the first latent diffusion model to generate the first latent representation, generating, using a second, different latent diffusion model and conditioned on the first latent representation, a second latent representation of the video in a second latent space, wherein the second latent representation of the video is at a second resolution that is a higher resolution than the first resolution, and wherein generating the second latent representation comprises performing a second reverse diffusion process that comprises a plurality of second timesteps using the second latent diffusion model conditioned on the first latent representation generated by performing the first reverse diffusion process using the first latent diffusion model; and processing, using a machine-learning decoder model, the second latent representation of the video to generate an output video in pixel space.

11. The system of claim 10, wherein performing the second reverse diffusion process comprises, at each of a plurality of the second timesteps:

processing, using the second latent diffusion model, a set of input data for the timestep to generate a denoising output for the second timestep, wherein the set of input data for the second timestep comprises the first latent representation, a set of output data of a previous second timestep and a timestep embedding corresponding to the second timestep.

12. The system of claim 11, wherein processing, using the second latent diffusion model, a set of input data for the second timestep to generate the denoising output for the second timestep comprises:

processing, using a downsampling branch, the set of input data for the second timestep to generate a downsampled representation of the input data for the second timestep;

processing, using an intermediate block, the downsampled representation of the input data for the second timestep to generate a set of transformed data for the second timestep;

processing, using an upsampling branch, the set of transformed data for the second timestep to generate a set of denoising data for the second timestep; and generating a set of output data for the second timestep based on the input data for the second timestep and the denoising data, wherein the second latent diffusion model comprises one or more skip connections between the downsampling branch and the upsampling branch.

13. The system of claim 12, wherein:

the downsampling branch comprises one or more convolutional layers and one or more transformer layers; and the upsampling branch comprises one or more convolutional layers and a one or more transformer layers, wherein the one or more convolutional layers of the downsampling branch are each connected to a respective convolutional layer in the upsampling branch via a skip connection, and wherein the one or more transformer layers of the downsampling branch are each connected to a respective transformer layer in the upsampling branch via a skip connection.

14. The system of claim 10, wherein:

the first latent representation comprises a plurality of first latent chunks of the video in the first latent space, wherein each first latent chunk in the first latent space corresponds to a respective chunk of video that overlaps with one or more other chunks of video; and generating, using the second latent diffusion model and conditioned on the first latent representation, the second latent representation of the video in the second latent space comprises:

processing, using the second latent diffusion model, each first latent chunk to generate a respective second latent chunk in the second latent space, wherein each second latent chunk in the second latent space corresponds to a respective chunk of video that overlaps with one or more other chunks of video; and merging the second latent chunks to generate the second latent representation in the second latent space.

15. The system of claim 14, wherein processing, using the second latent diffusion model, a first latent chunk to generate the respective second latent chunk in the second latent space is conditioned on one or more frames of a previously generated overlapping second latent chunk.

16. The system of claim 14, merging the second latent chunks to generate the second latent representation in the second latent space comprises performing interpolation on overlapping frames of the second latent chunks.

17. The system of claim 14, wherein processing, using the machine-learning decoder model, the second latent representation of the video to generate the output video in pixel space comprises:

splitting the second latent representation into a plurality of spatio-temporal chunks of latents, each spatio-temporal chunks overlapping with one or more other spatiotemporal chunks;

processing, using the machine-learning decoder model, each spatiotemporal chunk of latent to generate a respective chunk of output video data; and merging the chunks of output video data to generate the output video in pixel space.

18. The system of claim 17, wherein merging the chunks of output video data to generate the output video in pixel space comprises performing interpolation on overlapping frames of the chunks of output video data.

19. One or more non-transitory computer storage media storing instructions that when executed by one or more computers cause the one or more computers to perform operations comprising:

generating, using a first latent diffusion model, a first latent representation of a video in a first latent space, wherein the first latent representation of the video is at a first resolution, and wherein generating the first latent representation comprises performing a first reverse diffusion process that comprises a plurality of first timesteps using the first latent diffusion model;

after performing the first reverse diffusion process using the first latent diffusion model to generate the first latent representation, generating, using a second, different latent diffusion model and conditioned on the first latent representation, a second latent representation of the video in a second latent space, wherein the second latent representation of the video is at a second resolution that is a higher resolution than the first resolution, and wherein generating the second latent representation comprises performing a second reverse diffusion process that comprises a plurality of second timesteps using the second latent diffusion model conditioned on the first latent representation generated by performing the first reverse diffusion process using the first latent diffusion model; and processing, using a machine-learning decoder model, the second latent representation of the video to generate an output video in pixel space.

20. The one or more non-transitory computer storage media storing of claim 19, wherein the first latent representation comprises a plurality of first latent chunks of the video in the first latent space, wherein each first latent chunk in the first latent space corresponds to a respective chunk of video that overlaps with one or more other chunks of video; and generating, using the second latent diffusion model and conditioned on the first latent representation, the second latent representation of the video in the second latent space comprises:

processing, using the second latent diffusion model, each first latent chunk to generate a respective second latent chunk in the second latent space, wherein each second latent chunk in the second latent space corresponds to a respective chunk of video that overlaps with one or more other chunks of video; and merging the second latent chunks to generate the second latent representation in the second latent space.

* * * * *